(12) United States Patent
Mukumoto

(10) Patent No.: US 11,131,883 B2
(45) Date of Patent: Sep. 28, 2021

(54) PLANAR LIGHTING DEVICE

(71) Applicant: MINEBEA MITSUMI Inc., Nagano (JP)

(72) Inventor: Suguru Mukumoto, Fukuroi (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 16/386,413

(22) Filed: Apr. 17, 2019

(65) Prior Publication Data

US 2019/0391450 A1     Dec. 26, 2019

(30) Foreign Application Priority Data

Jun. 22, 2018   (JP) .............................. JP2018-119166
Oct. 26, 2018   (JP) .............................. JP2018-202206
Jan. 30, 2019   (JP) .............................. JP2019-014431

(51) Int. Cl.
*G02F 1/13357* (2006.01)
*G02F 1/1335* (2006.01)
*F21V 5/00* (2018.01)

(52) U.S. Cl.
CPC .. *G02F 1/133606* (2013.01); *G02F 1/133603* (2013.01); *G02F 1/133605* (2013.01); *G02F 1/133608* (2013.01); *F21V 5/005* (2013.01); *G02F 1/133607* (2021.01)

(58) Field of Classification Search
CPC ... G02F 2001/133607; G02F 1/133606; F21V 5/002; F21V 5/004; F21V 5/005; F21V 5/007
See application file for complete search history.

(56) References Cited

U.S. PATENT DOCUMENTS

| | | | | |
|---|---|---|---|---|
| 4,851,164 A | * | 7/1989 | Hayashi | ................. G03B 13/24 |
| | | | | 264/1.36 |
| 2004/0080938 A1 | * | 4/2004 | Holman | .................... F21S 8/08 |
| | | | | 362/231 |
| 2006/0203494 A1 | * | 9/2006 | Ohkawa | ............... G02B 5/0221 |
| | | | | 362/339 |
| 2006/0256580 A1 | * | 11/2006 | Kang | .................... G02B 6/0016 |
| | | | | 362/614 |
| 2007/0058359 A1 | * | 3/2007 | Saitoh | ............... G02F 1/133606 |
| | | | | 362/97.3 |
| 2007/0121340 A1 | | 5/2007 | Hoshi | |

(Continued)

FOREIGN PATENT DOCUMENTS

| | | |
|---|---|---|
| JP | 2004-355939 A | 12/2004 |
| JP | 2005-285702 A | 10/2005 |

(Continued)

OTHER PUBLICATIONS

Machine translation of JP 2007299572 A retrieved from ESPACENET. (Year: 2020).*

(Continued)

*Primary Examiner* — Alexander K Garlen
*Assistant Examiner* — Colin J Cattanach
(74) *Attorney, Agent, or Firm* — Pearne & Gordon LLP

(57) ABSTRACT

A planar lighting device according to an embodiment includes a substrate and a lens. A plurality of light sources are arranged on the substrate. The lens is formed to have, on an incident surface opposing the plurality of light sources, an optical element having a plurality of first optical parts that include a part that tapers from a bottom face having a hexagonal shape toward a tip, the first optical parts being arranged in a staggered arrangement.

17 Claims, 20 Drawing Sheets

(56) References Cited

U.S. PATENT DOCUMENTS

| | | | |
|---|---|---|---|
| 2009/0021667 A1* | 1/2009 | Horiguchi | G02B 5/0215 349/64 |
| 2009/0129058 A1 | 5/2009 | Tokita et al. | |
| 2010/0008061 A1* | 1/2010 | Chang | G02B 5/045 362/97.1 |
| 2013/0070478 A1* | 3/2013 | Edamitsu | G02B 5/0231 362/608 |
| 2015/0070901 A1* | 3/2015 | Rich | F21K 9/60 362/311.01 |
| 2015/0204491 A1* | 7/2015 | Yuan | F21V 5/045 362/311.02 |
| 2016/0363747 A1* | 12/2016 | Krijn | G02B 5/045 |
| 2017/0030549 A1* | 2/2017 | Kamada | G02B 5/045 |
| 2017/0097448 A1* | 4/2017 | Wang | G02B 5/0231 |
| 2017/0136953 A1* | 5/2017 | Tseng | B60Q 1/50 |
| 2017/0146214 A1* | 5/2017 | Purchase | B29D 11/0074 |
| 2019/0285950 A1* | 9/2019 | Liu | H05K 1/0204 |

FOREIGN PATENT DOCUMENTS

| | | |
|---|---|---|
| JP | 2007-178875 A | 7/2007 |
| JP | 2007-299572 A | 11/2007 |
| JP | 2008-140653 A | 6/2008 |
| JP | 2010-040192 A | 2/2010 |
| JP | 2013-065521 A | 4/2013 |
| WO | 2012029598 A1 | 3/2012 |

OTHER PUBLICATIONS

Japanese Office Action dated Aug. 20, 2019 for corresponding Japanese Application No. 2019-014431 and English translation.
Extended European Search Report dated Nov. 21, 2019 for corresponding European Application No. 19170496.4.
Decision of Dismissal of Amendment dated May 11, 2020 for corresponding Japanese Application No. 2019-014431 and English translation.
Decision of Refusal dated May 11, 2020 for corresponding Japanese Application No. 2019-014431 and English translation.
Decision to Grant a Patent dated Jul. 16, 2020 for corresponding Japanese Application No. 2019-014431 and English translation.
Notice of Reasons for Refusal dated Nov. 9, 2020 for corresponding Japanese Application No. 2020-137052 and English translation.
Decision to Grant a Patent dated Mar. 9, 2021 for corresponding Japanese Application No. 2020-137052 and English translation.

* cited by examiner

AT THE TIME OF SEVEN LIGHTINGS
(LED STAGGERED ARRANGEMENT)

AT THE TIME OF NINE LIGHTINGS
(LED RECTANGULAR ARRANGEMENT)

AT THE TIME OF NINE LIGHTINGS
(LED RECTANGULAR ARRANGEMENT)

AT THE TIME OF NINE LIGHTINGS
(LED RECTANGULAR ARRANGEMENT)

PLANAR LIGHTING DEVICE

CROSS-REFERENCE TO RELATED APPLICATION(S)

The present application claims priority to and incorporates by reference the entire contents of Japanese Patent Application No. 2018-119166 filed in Japan on Jun. 22, 2018, Japanese Patent Application No. 2018-202206 filed in Japan on Oct. 26, 2018, and Japanese Patent Application No. 2019-014431 filed in Japan on Jan. 30, 2019.

BACKGROUND OF THE INVENTION

1. Field of the Invention

The present invention relates to a planar lighting device.

2. Description of the Related Art

Conventionally, there are planar lighting devices that illuminate a display panel of a liquid crystal display from its back side. Such planar lighting devices can be roughly classified into an edge-light type and a direct type. In addition, among the planar lighting devices, what is called a local dimming (area light-emitting)-compliant planar lighting device that is capable of adjusting luminances per region on a light-emitting surface by controlling light quantity of each light source has been known.

In addition, in a local dimming (area light-emitting)-compliant direct type planar lighting device, luminances of respective regions can be made uniform by providing a lens that diffuses light emitted from a light source, and spreading and emitting the light from the light source. An example of related art is described in Japanese Laid-open Patent Publication No. 2008-140653.

However, because direct type planar lighting devices in recent years have an increased number of light sources arranged on a substrate, there is a risk in that luminances of a light-emitting surface become uneven due to occurrence of displacement between the light sources and lenses that are each arranged immediately above each of the light sources, in association with the increase of the light sources.

The present invention is made in view of the foregoing, and an objective thereof is to provide a planar lighting device that can improve luminance uniformity.

SUMMARY OF THE INVENTION

It is an object of the present invention to at least partially solve the problems in the conventional technology. A planar lighting device according to an embodiment includes a substrate and a lens. A plurality of light sources are arranged on the substrate. The lens is formed to have, on an incident surface opposing the plurality of light sources, an optical element having a plurality of first optical parts that include a part that tapers from a bottom face having a hexagonal shape toward a tip, the first optical parts being arranged in a staggered arrangement.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
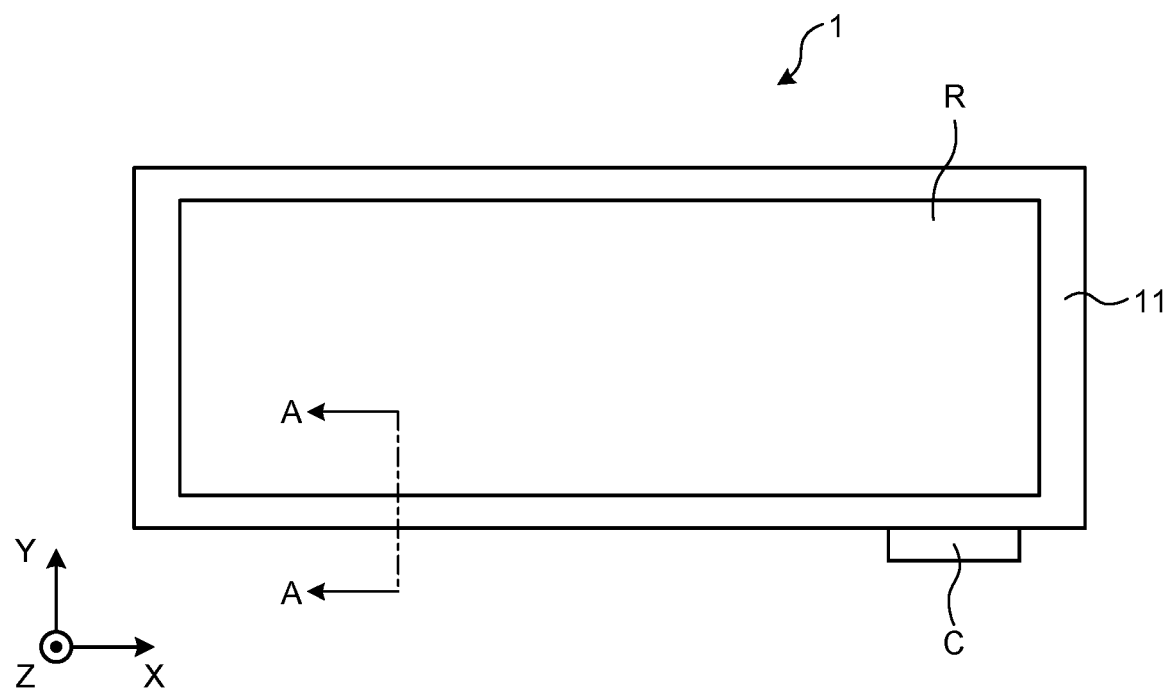
FIG. 1 is a top view of a planar lighting device according to an embodiment.

Hereinafter, a planar lighting device according to an embodiment is described with reference to the drawings. The following embodiment does not limit the present invention. In addition, the dimensional relations of each element, the ratios of each element, and the like in the drawings may be different from reality. Furthermore, the drawings may include portions where the dimensional relations or ratios are different among the drawings. For convenience of explanation, the following drawings illustrate a three-dimensional orthogonal coordinate system in which a light emission direction of the planar lighting device is regarded as a Z-axis positive direction. This orthogonal coordinate system may be illustrated in other drawings referred to in the following descriptions.

Figure 2:
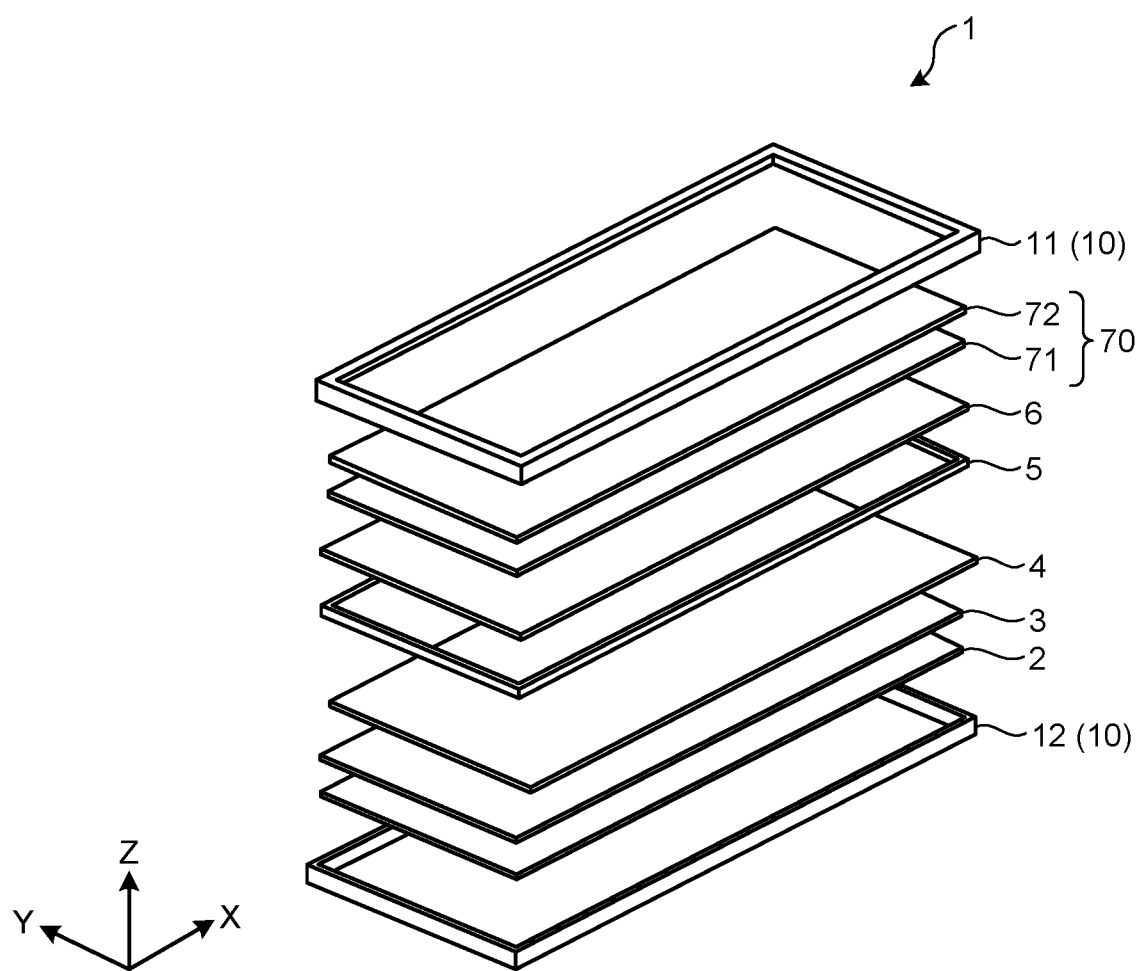
FIG. 2 is an exploded perspective view of the planar lighting device according to the embodiment.
Figure 3:
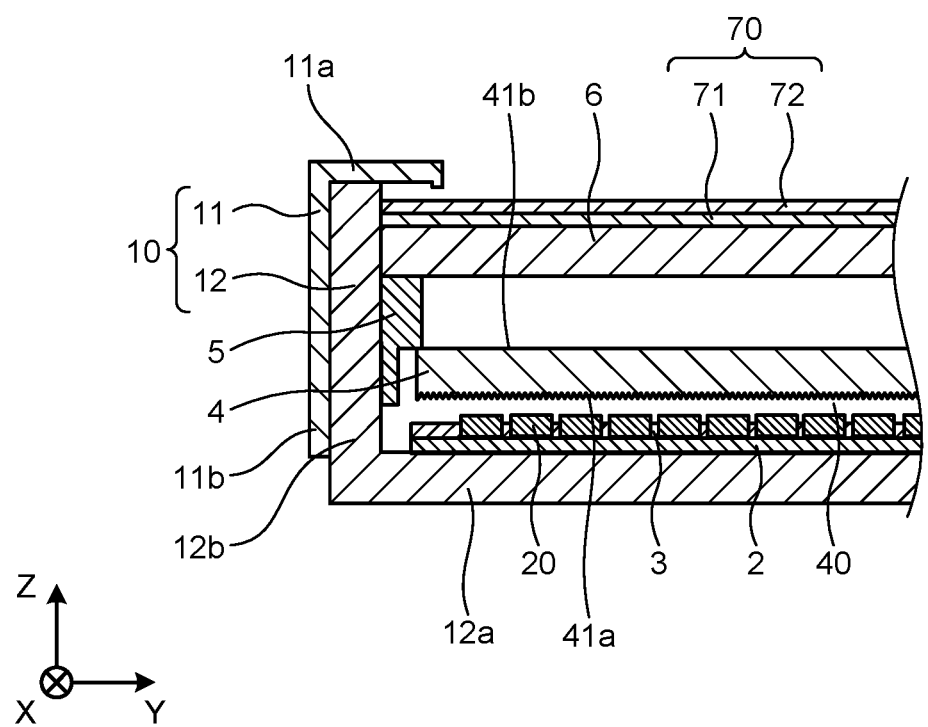
FIG. 3 is a cross-section view of the planar lighting device according to the embodiment.

First, an overview of the planar lighting device according to the embodiment is described with reference to FIGS. 1 to 3. FIG. 1 is a top view of the planar lighting device according to the embodiment. FIG. 2 is an exploded perspective view of the planar lighting device according to the embodiment. FIG. 3 is a cross-section view of the planar lighting device according to the embodiment. FIG. 3 illustrates a cross-section when cutting at a line A-A illustrated in FIG. 1.

A planar lighting device 1 according to the embodiment is a lighting device that is used as a backlight of various liquid crystal displays, and is what is called a direct type planar lighting device in which a light source 20, which will be described later, is arranged immediately below a liquid crystal display. Liquid crystal displays that are targets to which the planar lighting device 1 is applied, are for example, electronic meters, indicators, and the like, which are on-board devices. However, the targets are not limited to on-board devices, and they may be optional liquid crystal displays.

As illustrated in FIG. 1, the planar lighting device 1 according to the embodiment has an emission region R that is defined by an upper frame 11, which will be described later. The planar lighting device 1 emits planar light by the emission region R, and functions as the backlight of liquid crystal displays described above.

In addition, the direct type planar lighting device 1 can deal with what is called local dimming, which partially adjusts luminances of the emission region R by individually controlling a plurality of the light source 20, which will be described later.

In addition, as illustrated in FIG. 1, the planar lighting device 1 according to the embodiment has a connector C. The connector C is connected with, for example, a power wiring or a signal wiring. More specifically, power and signals are supplied to the planar lighting device 1 according to the embodiment via the connector C.

In addition, as illustrated in FIGS. 2 and 3, the planar lighting device 1 according to the embodiment includes a substrate 2, a reflective plate 3, a lens (lens sheet) 4, a spacer 5, a diffusion plate 6, a frame 10, the light source 20, and an optical sheet 70.

The frame 10 is, for example, a sheet metal frame made of stainless steel, having large rigidity. The frame 10 is provided with the upper frame 11 and a lower frame 12, and the frame 10 contains the respective parts of the planar lighting device 1 such as the substrate 2, the reflective plate 3, the lens 4, the spacer 5, the diffusion plate 6, the light source 20, and the optical sheet 70.

The upper frame 11 is arranged on the light emission direction side, which is the Z-axis positive direction side, with respect to the lower frame 12, and the upper frame 11 functions as a lid of the frame 10. In addition, the upper frame 11 includes a top board 11a and a side wall 11b. An opening is formed in the central part of the top board 11a in top view (seen from the Z-axis positive direction), and the above-described emission region R is defined by this opening. The side wall 11b is in succession with the peripheral end (the opposite side of the opening) of the top board 11a, and the side wall 11b extends along a side wall 12b of the lower frame 12, which will be described later.

The lower frame 12 is arranged on the Z-axis negative direction side with respect to the upper frame 11, to function as a base of the frame 10. In addition, the lower frame 12 includes a bottom 12a and the side wall 12b. The bottom 12a has a rectangular shape in top view, and defines the shape of the planar lighting device 1 in top view. The side wall 12b is in succession with the peripheral end of the bottom 12a, and the side wall 12b extends along the side wall 11b of the upper frame 11.

The substrate 2 is, for example, a circuit substrate made of epoxy resin or polyimide (PI). For example, a flexible substrate (FPC: Flexible Printed Circuit) can be applied.

The light source 20 is a point-like light source and, for example, a light emitting diode (LED) can be applied. For example, a package type LED or chip type LED can be used as the light source 20. However, the light source 20 is not limited thereto. When the chip type LED is used as the light source 20, a wavelength conversion member such as a phosphor sheet may be combined. The light source 20 is not limited to the LED, and an optional light-emitting member can be applied. In addition, the plurality of light sources 20 are mounted on the substrate 2 in a predetermined arrangement. In this regard, an arrangement example of the light source 20 is described with reference to FIG. 5A.

Figure 5A:
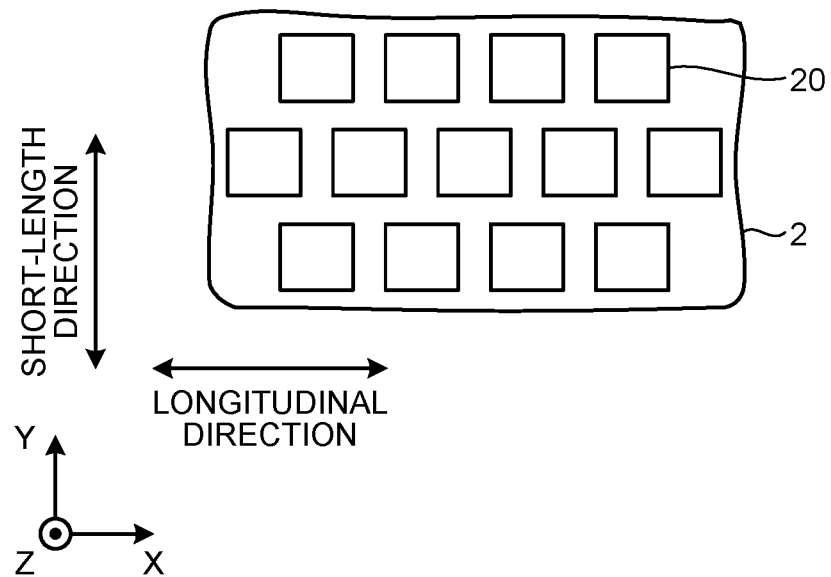
FIG. 5A is a diagram illustrating an arrangement example of light sources according to the embodiment.

FIG. 5A is a diagram illustrating an arrangement example of the light source 20 according to the embodiment. FIG. 5A illustrates a top view of a portion of the substrate 2 that is seen from the Z-axis positive direction side. As illustrated in FIG. 5A, the plurality of light sources 20 are arranged on the substrate 2 in a staggered arrangement (arranged in a hexagonal lattice shape). In the example illustrated in FIG. 5A, one optional light source 20 is arranged at the center, and six light sources 20 are arranged in the surrounding. Specifically, the six light sources 20 are arranged at regular intervals (for example, at 60° interval) around the light source 20 that is arranged at the center. In other words, one light source 20 is arranged at predetermined intervals such that it is surrounded by the six light sources 20.

Figure 5B:
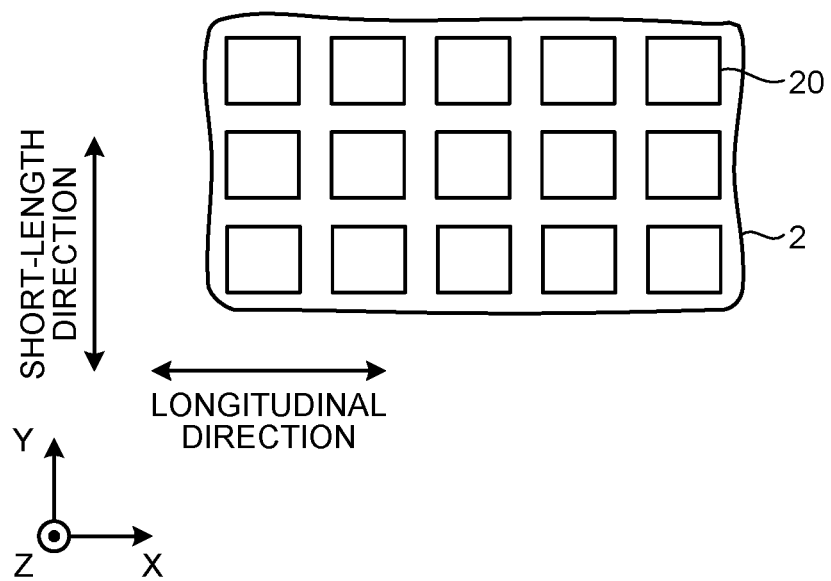
FIG. 5B is a diagram illustrating another arrangement example of the light sources according to the embodiment.

Although the plurality of light sources 20 are arranged in a staggered arrangement in the example illustrated in FIG. 5A, the arrangement is not limited to staggered arrangements. As illustrated in FIG. 5B, the arrangement of the plurality of light sources 20 may be a rectangular arrangement (for example, matrix arrangement or lattice arrangement). FIG. 5B is a top view illustrating another arrangement example of the light source 20 according to the embodiment. The planar lighting device 1 according to the present embodiment can perform what is called local dimming (area light-emitting), which adjusts luminances per light-emitting region corresponding to each light source 20.

The reflective plate 3 is arranged on the substrate 2, and at a position corresponding to each light source 20 mounted on the substrate 2, a hole in which the light source 20 is to be arranged is formed. The reflective plate 3 is formed of, for example, white resin, and it has a light-reflecting function. Specifically, when light of the light source 20 that has once entered into the lens 4 leaks and returns to the light source 20 side, the reflective plate 3 reflects the returned light to the lens 4 again. In this manner, the emission efficiency of the planar lighting device 1 can be improved.

The lens 4 performs a light distribution control on light emitted from the light source 20. Specifically, the light emitted from the light source 20 is refracted at the lens 4 to be spread and emitted. The lens 4 is, for example, a plate-like member made of a material such as polymethyl methacrylate (PMMA), polycarbonate, polyethylene terephthalate (PET), or silicone, and the lens 4 integrally covers the plurality of light sources 20 arranged on the substrate 2.

In addition, the lens 4 has two principal surfaces 41a, 41b. The principal surface 41a, which is one of the two principal surfaces, is a surface opposing the light source 20, and it is an incident surface (hereinafter, the incident surface 41a) into which light of the light source 20 enters. The principal surface 41b, which is the other surface, is the back side of the incident surface 41a, and it is an emission surface (hereinafter, the emission surface 41b) that emits the light entered from the incident surface 41a. In addition, as illustrated in FIG. 3, an optical element (a prism in the present embodiment) 40 having a fine concavo-convex shape is formed on the incident surface 41a. This point will be described later.

The spacer 5 is formed in, for example, a square shape in top view. In addition, the spacer 5 extends along the side wall 12b of the lower frame 12, and is arranged between the lens 4 and the diffusion plate 6 so as to maintain a regular interval between the lens 4 and the diffusion plate 6. The spacer 5 presses the diffusion plate 6 from the bottom side in the longitudinal direction (X-axis) of the planar lighting device 1, and presses the lens 4 from the top side in the longitudinal direction.

Specifically, the spacer 5 presses a peripheral end of the emission surface 41b in the lens 4 toward the light source 20, which is on the Z-axis negative direction side. In addition, the spacer 5 presses a peripheral end of the diffusion plate 6, which will be described later, toward the light emission direction side, which is the Z-axis positive direction side. In this manner, a regular interval between the lens 4 and the diffusion plate 6 is maintained, and thus luminances of light emitted from the lens 4 can be made uniform.

For example, a hard member, an elastic member, or the like can be applied to the spacer 5. However, the material, the physical property, and the like are not particularly limited as long as a regular interval between the lens 4 and the diffusion plate 6 can be maintained. Alternatively, a light-reflecting function may be further provided, by forming the spacer 5 with a white resin material or the like. In addition, although the example in which the spacer 5 is formed in a square shape in top view is shown, the shape is not limited thereto.

The diffusion plate 6 is formed of a material such as a resin, and it diffuses light of the light source 20 emitted from the lens 4. The diffusion plate 6 diffuses the light emitted from the lens 4, and emits the light in the light emission direction, which is on the Z-axis positive direction side. More specifically, the light emitted from the lens 4 is diffused by the diffusion plate 6, and is guided to the optical sheet 70.

Figure 6:
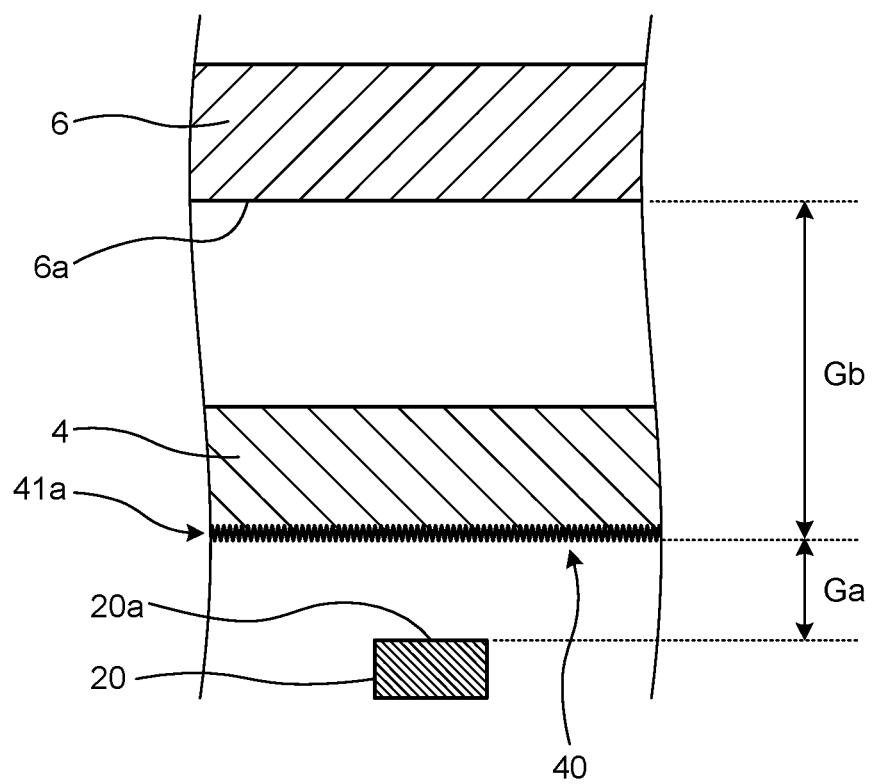
FIG. 6 is an explanatory view of positional relations of a diffusion plate, a lens, and the light sources.

In this regard, the positional relations of the diffusion plate 6, the lens 4, and the light source 20 are described with reference to FIG. 6. FIG. 6 is an explanatory view of the positional relations of the diffusion plate 6, the lens 4, and the light source 20.

As illustrated in FIG. 6, the lens 4 is arranged between the diffusion plate 6 and the light source 20. More specifically, an incident surface 6a of the diffusion plate is a surface opposing the emission surface 41b of the lens 4. In addition, the lens 4 and the light source 20 are distantly arranged. In addition, the lens 4 and the diffusion plate 6 are distantly arranged. In other words, the lens 4 is arranged so as to be distant from each of the diffusion plate 6 and the light source 20.

In addition, in the condition that the distance between the light source and the diffusion plate is set to a predetermined value, the lens 4 is arranged at a position in which a distance Gb from the optical element 40 to the diffusion plate 6 is longer than a distance Ga from the optical element 40 to the light source 20. Specifically, the distance Gb from the incident surface 41a (optical element 40) of the lens 4 to the incident surface 6a of the diffusion plate 6 is longer than the distance Ga from a top face 20a of the light source 20 to the incident surface 41a (optical element 40) of the lens 4.

Thus, by making the distance Ga from the top face 20a of the light source 20 to the incident surface 41a of the lens 4 shorter, the distance Gb from the incident surface 41a to the incident surface 6a of the diffusion plate 6 can be made longer. In this manner, because the optical path from the lens 4 to the diffusion plate 6 can be made longer, light refracted and emitted from the lens 4 is further spread to enter into the diffusion plate 6. Thus, by arranging the lens 4 at the position where the distance Gb is longer than the distance Ga in the condition that the distance between the light source and the diffusion plate is set to the predetermined value, a working effect of spreading the light of the lens 4 can be effectively exerted, and luminances can be made uniform. Alternatively, it is also possible to broaden an arrangement pitch of the light source 20, and decrease the number of lightings of the light source 20. Although the embodiment described above explained the lens 4 at the position where the distance Gb is longer than the distance Ga, the relation regarding the distance Ga and the distance Gb is not limited thereto.

In FIG. 6, the distance Ga and the distance Gb are calculated with reference to the incident surface 41a of the lens 4, i.e., a bottom face 40a2 of a first optical part 40a or a bottom face 40b2 of a second optical part 40b (described later, see FIG. 4B) in the optical element 40. However, the distance Ga and the distance Gb may be calculated with reference to a tip of the first optical part 40a or a tip of the second optical part 40b in the optical element 40.

The optical sheet 70 is a member for performing an optical adjustment such as a light distribution control such as uniforming or condensing, on light emitted from the diffusion plate 6. For example, the optical sheet 70 is a member that is also referred to as a prism sheet, wherein prisms having triangle shapes in cross-section view are formed on the principal surface on the light emission direction side, which is the Z-axis positive direction side. In addition, as illustrated in FIG. 2 and FIG. 3, for example, the optical sheet 70 includes two sheets, which are a first sheet 71 and a second sheet 72.

For example, the first sheet 71 is a prism sheet (for example, Brightness Enhancement Film manufactured by the 3M company), and the second sheet 72 is a reflection type polarizing sheet (for example, Dual Brightness Enhancement Film manufactured by the 3M company). However, they may be optionally changed depending on the light emission mode required in the planar lighting device 1.

In addition, the optical sheet 70 is fixed to the emission surface of the diffusion plate 6 by, for example, an adhesive member such as an adhesive agent or double-sided tape.

In addition, the configuration of the planar lighting device 1 illustrated in FIG. 2 and FIG. 3 is only an example. For example, an elastic member such as rubber or sponge may be provided between the top board 11a of the upper frame 11 and the optical sheet 70. This elastic member presses the diffusion plate 6 via the optical sheet 70 from the top board 11a of the upper frame 11. In this manner, when vibration is caused in the planar lighting device 1, this vibration will be absorbed by the elastic member, and thus displacement of the diffusion plate 6 due to the vibration can be prevented.

Meanwhile, in a general direct type planar lighting device, when a plurality of light sources are arranged on a substrate and a lens is arranged immediately above each of the plurality of light sources as described above, it may become difficult to align the light sources and the lens. For example, when a large number of light sources are arranged on a substrate, it becomes difficult to align the light sources and the lens. Thus, the general direct type planar lighting device had a risk in that when a plurality of light sources are laid and arranged on a substrate, the luminance uniformity decreases due to occurrence of displacement between the light sources and the lens.

Thus, in the planar lighting device 1 according to the present embodiment, the optical element 40 is formed on the incident surface 41a of the lens 4. Specifically, the lens 4 has, on the incident surface 41a, the optical element 40 having a plurality of recesses, each recessed in a hexagonal pyramid shape in a direction away from the light source 20 (Z-axis positive direction). In this manner, the lens 4 having the optical element 40, which is formed to have the plurality of recesses in hexagonal pyramid shapes arranged with a pitch smaller than the pitch of the light source 20, on the incident surface 41a opposing the light source 20, integrally covers the substrate 2 where the plurality of light sources 20 are arranged, so as to enable uniforming of luminances of the light-emitting surface without alignment even when a large number of light sources 20 are arranged on the substrate 2.

In this manner, by integrally covering the substrate 2 where the plurality of light sources 20 are arranged, with the lens 4, which is formed to have the optical element 40 arranged with the pitch smaller than the pitch of the light source 20, alignment (positioning) of the light source 20 and the lens 4 will not be required. That is to say, by using the planar lighting device 1 according to the embodiment, displacement between the light source 20 and the lens 4 can be substantially ignored, and thus the luminance uniformity can be improved.

Figure 4A:
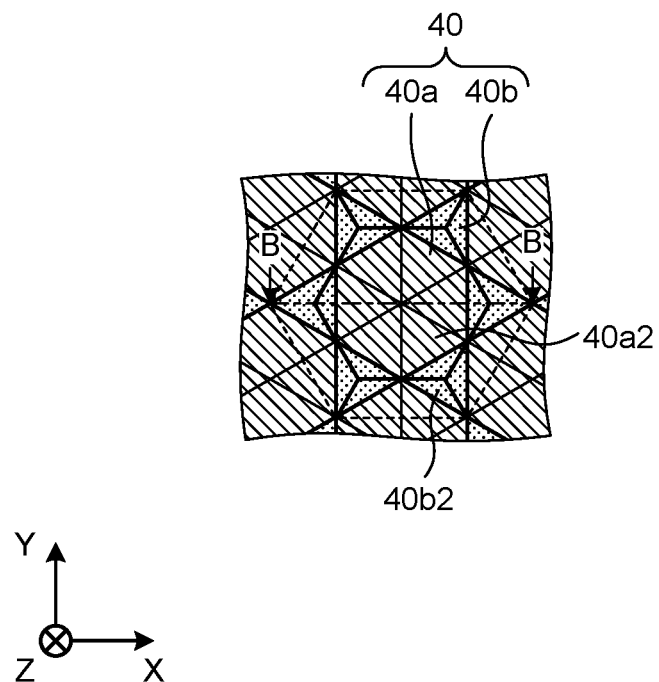
FIG. 4A is a diagram illustrating an optical element.
Figure 4B:
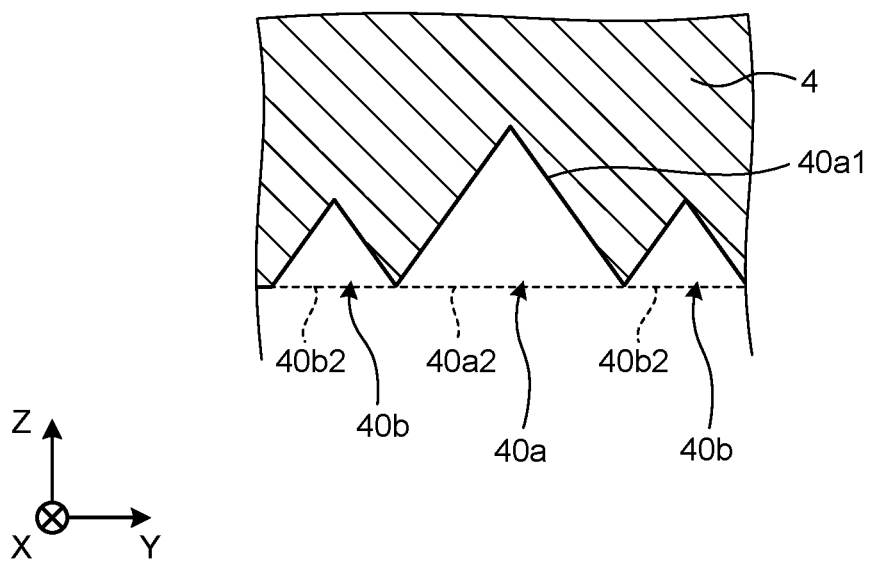
FIG. 4B is a diagram illustrating the optical element.
Figure 4C:
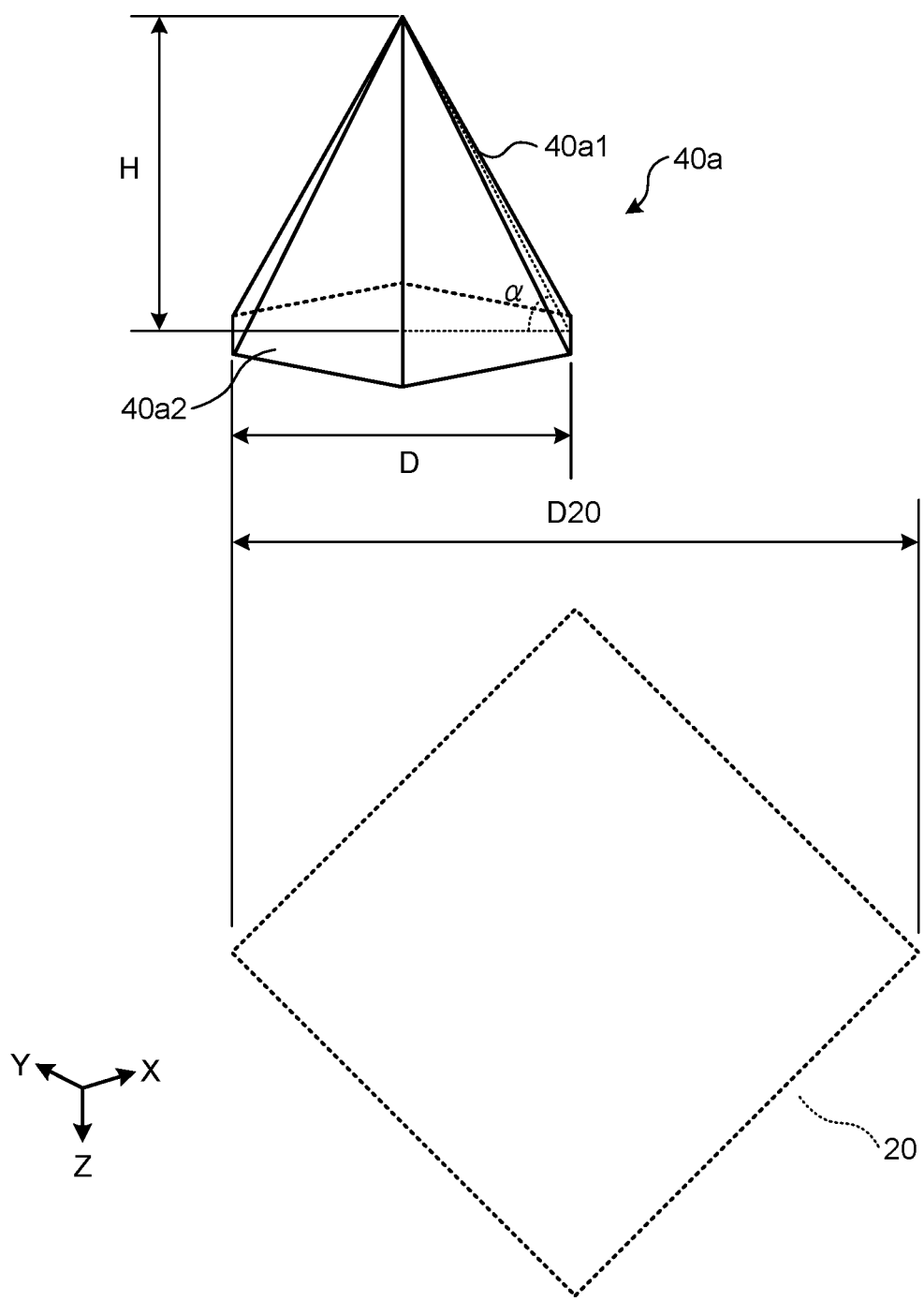
FIG. 4C is a diagram illustrating the optical element.

In this regard, the optical element 40 is described in detail with reference to FIG. 4A to FIG. 4C. FIG. 4A to FIG. 4C are diagrams illustrating the optical element 40. FIG. 4A is a diagram illustrating the optical element 40 seen from the Z-axis negative direction side; FIG. 4B is a cross-section surface when cutting at a line B-B illustrated in FIG. 4A; and FIG. 4C illustrates a perspective view of the first optical part 40a of the optical element 40.

As illustrated in FIG. 4A and FIG. 4B, the optical element 40 has the first optical part 40a and the second optical part 40b. As illustrated in FIG. 4A to FIG. 4C, the first optical part 40a has the bottom face 40a2 having a hexagonal shape in top view (regions with hatched lines illustrated in FIG. 4A). Further, as illustrated in FIG. 4B and FIG. 4C, the first optical part 40a has a pyramid-shaped recess that tapers from the bottom face 40a2 toward a tip, which is on the Z-axis positive direction side, i.e., a recess that is recessed in a hexagonal pyramid shape (hereinafter, may be referred to as the first recess 40a). In other words, the first optical part 40a has a shape that includes a part in which the area of a cross-section surface that is approximately parallel to the bottom face 40a2 gets smaller toward the tip.

In addition, first optical parts 40a are arranged in a staggered arrangement in top view. This point will be described later with reference to FIG. 7A. The first optical part 40a is not limited to a recess, and it may be a projection part. The tip shape is also not limited to a pyramid shape, and it may be an optional shape such as an arc shape. In other words, an optional shape can be applied to the first optical part 40a as long as that shape has a part that tapers from the bottom face 40a2 in a hexagonal shape toward the tip, which is on the Z-axis positive direction side. In addition, the first optical part 40a does not have to be an exact pyramid shape. More specifically, even if the tip of the first optical part 40a is, for example, somewhat arc-shaped due to a manufacturing error or the like, this can be regarded as a pyramid shape.

In addition, as illustrated in FIG. 4C, an inclined face 40a1 that intersects with the bottom face 40a2 is formed in the first optical part 40a. In the first optical part 40a, an angle $\alpha$ between the inclined face 40a1 and the bottom face 40a2 is 44° or greater and 58° or smaller. Alternatively, in the first optical part 40a, the angle $\alpha$ between the hexagonal pyramid-shaped bottom face 40a2 and the hexagonal pyramid-shaped inclined face 40a1 is preferably, for example, 44° or greater and 55° or smaller. More preferably, in order to improve the luminance uniformity of the light-emitting surface, the angle $\alpha$ between the inclined face 40a1 and the bottom face 40a2 in the first optical part 40a is preferably, for example, 50°.

In addition, as illustrated in FIG. 4C, a length D between opposite sides of the first optical part 40a is shorter than a length D20 between opposite angles of the light source 20 having, for example, a rectangular shape (in top view). Specifically, the length D of the first optical part 40a is preferably half or shorter than the length D20 between the opposite angles of the light source 20. In other words, the length D between the opposite sides of the first optical part 40a is preferably half or shorter than a maximum distance of the light source 20 in top view. Alternatively, the length D of the first optical part 40a is more preferably one tenth or shorter than the maximum distance of the light source 20 in top view. That is to say, because the first optical part 40a is smaller than the light source 20 in top view, even if displacement between the light source 20 and the first optical part 40a occurs, this displacement can be substantially ignored, and thus lowering of the luminance uniformity can be prevented. If a space (flat part) is provided between adjacent first optical parts 40a, the length D of the first optical part 40a can be replaced with the pitch of the optical element 40.

The shape of the light source 20 in top view is not limited to a rectangular shape, and it may be other shapes such as a circle and a polygon. For example, in the case of the light source 20 having a circular shape, the length D of the first optical part 40a is preferably half or shorter than the diameter of the light source 20. In other words, the length (length D) between the opposite sides in the bottom face having a hexagonal shape of the first optical part 40a is preferably half or shorter than the maximum distance of the light source 20 in top view.

In addition, the length D and a height H (the distance from the bottom face to the tip) of the first optical part 40a may be optional, and the length D and the height H do not have to be evenly the same in all of a plurality of the first optical part 40a. In other words, the plurality of first optical parts 40a each may have different lengths D and heights H, or they may be evenly the same.

Furthermore, the above-described length and the height of the second optical part 40b, which will be described later, similarly may be optional. In other words, a plurality of the second optical part 40b each may have different lengths and heights, or they may be evenly the same.

In addition, as illustrated in FIG. 4A, the second optical part 40b has the bottom face 40b2 having a triangular shape in top view (dotted regions illustrated in FIG. 4A). As illustrated in FIG. 4B, the second optical part 40b has a pyramid-shaped recess that tapers from the bottom face 40b2 toward a tip, which is on the Z-axis positive direction side, i.e., a recess that is recessed in a trigonal pyramid shape (hereinafter, may be referred to as the second recess 40b). In other words, the second optical part 40b has a shape that includes a part in which the area of a cross-section surface that is approximately parallel to the bottom face 40b2 gets smaller toward the tip.

The second optical part 40b is not limited to a recess, and it may be a projection part. The tip shape is also not limited to a pyramid shape, and it may be an optional shape such as an arc shape. In other words, an optional shape can be applied to the second optical part 40b as long as that shape has a part that tapers from the bottom face having a triangular shape toward the tip. In addition, the second optical part 40b does not have to be an exact pyramid shape. More specifically, even if the tip of the second optical part 40b is, for example, somewhat spherical due to a manufacturing error or the like, this can be regarded as a pyramid shape.

In addition, as illustrated in FIG. 4B, the second recess 40b is shallower than the first recess 40a. In other words, the length from the bottom face 40b2 to the tip of the second recess 40b is shorter than the length from the bottom face 40a2 to the tip of the first recess 40a. When the first optical part 40a and the second optical part 40b are projection parts, the second optical part 40b is formed such that the height from the bottom face to the apex is lower than that of the first optical part 40a. More specifically, the length from the bottom face to the tip of the second optical part 40b is shorter than that of the first optical part 40a.

In addition, the first optical part 40a and the second optical part 40b may be formed such that a recess and a projection part are mixed. In other words, a configuration in which the first optical part 40a is a projection part and the second optical part 40b is a recess may be used, or a configuration in which the first optical part 40a is a recess and the second optical part 40b is a projection part may be used. In addition, out of the first optical part 40a and the second optical part 40b, the second optical part 40b may be omitted from the optical element 40 as long as at least the first optical part 40a is provided.

Furthermore, as illustrated in FIG. 4A, the optical element 40 is recessed in a star-like hexagonal shape by having one first recess 40a and a plurality of the second recess 40b that are adjacent to this first recess 40a. Specifically, the plurality of second recesses 40b are adjacent at positions corresponding to each of the bases of the bottom face 40a2 in the first recess 40A. More specifically, the bottom face 40b2 of the second recess 40b and the bottom face 40a2 of the first recess 40a are arranged by sharing the base. However, not limited to this, a space (flat part) may be provided between the first recess 40a and the second recess 40b.

In this manner, light of the light source 20 entering from the Z-axis negative direction side of the lens 4 enters by being refracted at the first recess 40a and the second recess 40b. That is to say, when light enters into the lens 4, the light is spread by refraction, and is emitted from the lens 4. Thus, it is possible to prevent a luminance of a part immediately above the light source 20 from being higher than that in the surrounding of the portion immediately above. Accordingly, it is possible to prevent the part immediately above the light source 20 from being too bright, and luminances of the light-emitting surface can be made uniform in the case of local dimming (area light-emitting) and also in the case of full lighting of the light sources 20 (increasing the luminance).

In addition, by arranging the optical element 40 having the plurality of hexagonal pyramid-shaped first recesses 40a and second recesses 40b on the incident surface 41a opposing the plurality of light sources 20 in a staggered arrangement, the lens 4 according to the embodiment allows luminance distributions of light emitted from each of the light sources 20 to have a hexagonal shape. In other words, the shape of light-emitting regions corresponding to the respective light sources 20 can be made into a hexagonal shape on the light-emitting surface.

In this manner, in the planar lighting device 1 according to the embodiment, luminance distributions of light emitted from each of the light sources 20 are made into a hexagonal shape (a polygonal shape having linear sides). Thus, intervals of each of the light-emitting regions are made narrower, and high-density local dimming (area light-emitting) is enabled. In addition, when lighting several of the adjacent light sources 20 (increasing the luminance), or fully lighting the light sources 20 (increasing the luminance), luminances of the light-emitting surface can be made uniform due to the narrow intervals of each of the light-emitting regions. Accordingly, the planar lighting device 1 according to the present embodiment can control contrast more finely at the time of local dimming (area light-emitting), while uniforming luminance of the light-emitting surface.

Furthermore, in the planar lighting device 1 according to the embodiment, by arranging the trigonal pyramid-shaped second recess 40b between the plurality of hexagonal pyramid-shaped first recesses 40a on the incident surface 41a of the lens 4, a flat region between the first recesses 40a can be reduced. In other words, the percentage of the optical element 40 (the first recesses 40a and the second recesses 40b) on the incident surface 41a can be increased. That is to say, by reducing the flat region on the incident surface 41a, the spread light will increase by refraction at the optical element 40 (prism), and thus spreading of the light can be enhanced. Accordingly, the luminance uniformity can be improved.

Figure 7A:
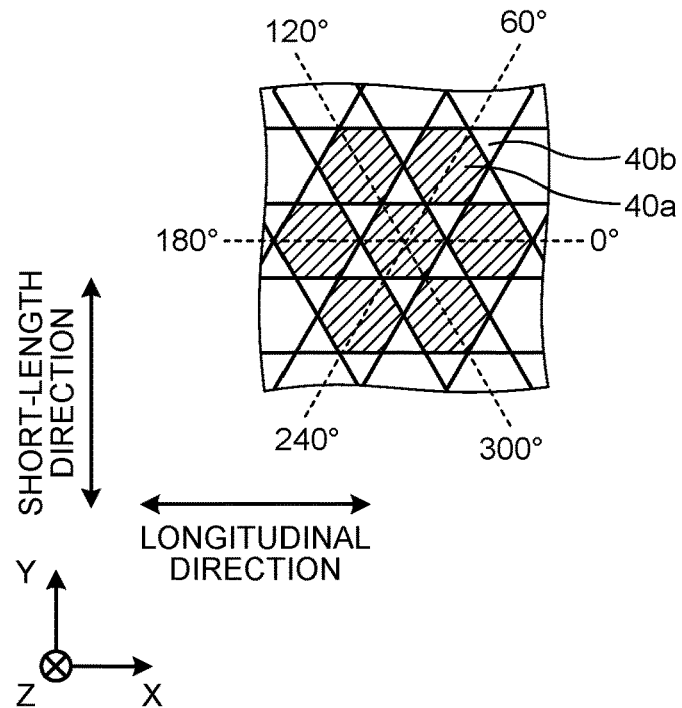
FIG. 7A is a diagram illustrating an arrangement example of a first recess and a second recess according to the embodiment.

The following describes the arrangements of the first recess 40a and the second recess 40b of the optical element 40 according to the embodiment, with reference to FIG. 7A. FIG. 7A is a diagram illustrating an arrangement example of the first recess 40a and the second recess 40b according to the embodiment.

Figure 7B:
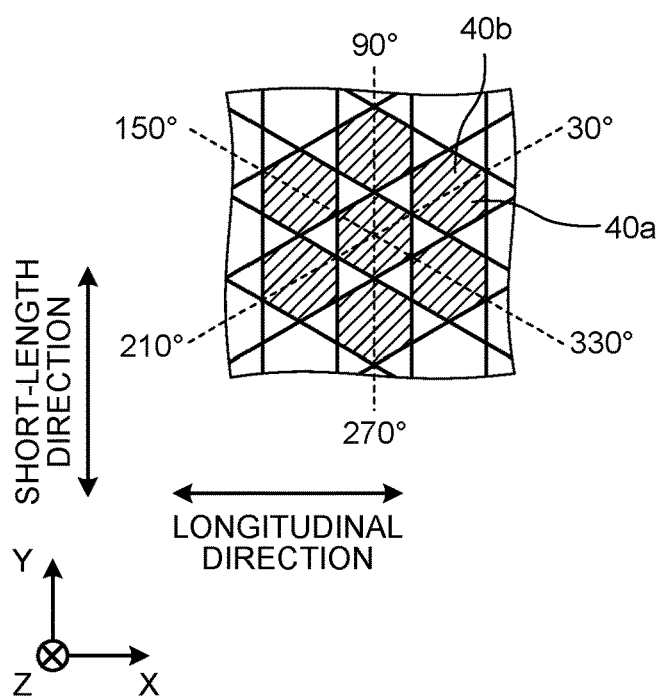
FIG. 7B is a diagram illustrating an arrangement example of the first recess and the second recess according to a modification.

As illustrated in FIG. 7A, the plurality of first recesses 40a are arranged in a staggered arrangement (arranged in a hexagonal lattice shape) in top view. The staggered arrangement refers to an arrangement in which the first recesses 40a are arranged at each of the apexes and the center of a hexagonal shape, and this hexagonal shape is continuously arranged. In other words, the plurality of first recesses 40a are hexagonally arranged on the incident surface 41a of the lens 4. In the present embodiment, as illustrated in FIG. 7A and FIG. 7B, the plurality of first recesses 40a (the first optical parts 40a) are symmetrically arranged while setting each of the apexes of the first recess 40a (each of the apexes of the bottom face 40a2 in the first recess 40a) as a boundary. In this case, manufacturing is easy because straight lines are consecutive. The plurality of first recesses 40a may be symmetrically arranged while setting each of the sides of the first recess 40a as a boundary. In the example illustrated in FIG. 7A, the arrangement is made such that one first recess 40a is surrounded by six first recesses 40a, and the six first recesses 40a are in contact with one another. However, not limited to this, the arrangement can be made by providing a space (flat part) between adjacent first recesses 40a.

Specifically, in the example illustrated in FIG. 7A, when optional one first recess 40a is set as the center, other six first recesses 40a are arranged at approximately 60° intervals in the rotation direction around the center. More specifically, the other six first recesses 40a are arranged at positions of 0°, 60°, 120°, 180°, 240°, and 300° with respect to the first recess 40a at the center.

In other words, the first recesses 40a are arranged in the direction parallel to the X-axis direction (0° and) 180°, the direction that is +30° with respect to the Y-axis direction (120° and 300°), and the direction that is −30° with respect to the Y-axis direction (60° and 240°).

Furthermore, the second recess 40b is arranged in each of the spaces between the plurality of first recesses 40a. More specifically, the optical element 40 is formed in a star-like hexagonal shape in top view by having one first recess 40a and a plurality of the second recess 40b (six of them in FIG. 7A) adjacent to the first recess 40a.

Furthermore, the optical element 40 having such a star-like hexagonal shape can be created by cutting a mold in the directions of "0°-180°", "60°-240°", and "120°-300°", as illustrated in FIG. 7A. More specifically, by forming the optical element 40 as a recess having a star-like hexagonal shape, the creation of the mold can be made easy, and thus rise in cost can be suppressed.

The arrangement of the first recess 40a and the second recess 40b illustrated in FIG. 7A is an example. For example, the arrangement example illustrated in FIG. 7A may be rotated by a predetermined angle in the rotation direction. This point will be described with reference to FIG. 7B.

FIG. 7B is a diagram illustrating an arrangement example of the first recess 40a and the second recess 40b according to a modification. FIG. 7B illustrates an arrangement in which the arrangement illustrated in FIG. 7A is rotated by 90° (can also be regarded as 30° or 60°).

More specifically, with respect to the first recess 40a at the center, other first recesses 40a are arranged at positions of 30°, 90°, 150°, 210°, 270°, and 330°. In other words, the first recesses 40a are arranged in the direction parallel to the Y-axis direction (90° and 270°), the direction that is +30° with respect to the X-axis direction (30° and 210°), and the direction that is −30° with respect to the X-axis direction (150° and 330°).

Although FIG. 7B illustrates a case in which the arrangement illustrated in FIG. 7A is rotated by 90° (can also be regarded as 30° or 60°), the rotation angle may be set to an optional angle depending on light-emission characteristics required in the planar lighting device 1.

In addition, in the planar lighting device 1 according to the present embodiment, a plurality of the optical element 40 arranged in the lens 4 are hexagonal pyramid-shaped prisms that are recessed in the direction away from the plurality of light sources 20. Light emitted from the plurality of light sources 20 is spread by refraction at the prisms, and the light is emitted from the emission surface 41b of the lens 4. In this manner, it is possible to prevent the part immediately above the light source 20 from being too bright, and luminances of the light-emitting surface can be made uniform in the case of local dimming (area light-emitting) and also in the case of full lighting of the light sources 20 (increasing the luminance).

In addition, by arranging the optical element 40 having the a plurality of hexagonal pyramid-shaped first recesses 40a and trigonal pyramid-shaped second recesses 40b on the incident surface 41a opposing the plurality of light sources 20 in a staggered arrangement, the lens 4 according to the present embodiment allows luminance distributions of light emitted from each of the light sources 20 to have a hexagonal shape. In other words, the shape of light-emitting regions corresponding to the respective light sources 20 can be made into a hexagonal shape on the light-emitting surface. In this manner, because intervals of the light-emitting region of each of the light sources 20 are made narrower, luminances of a light-emitting surface become uniform, and finer contrast control is enabled at the time of local dimming (area light-emitting).

Figure 8:
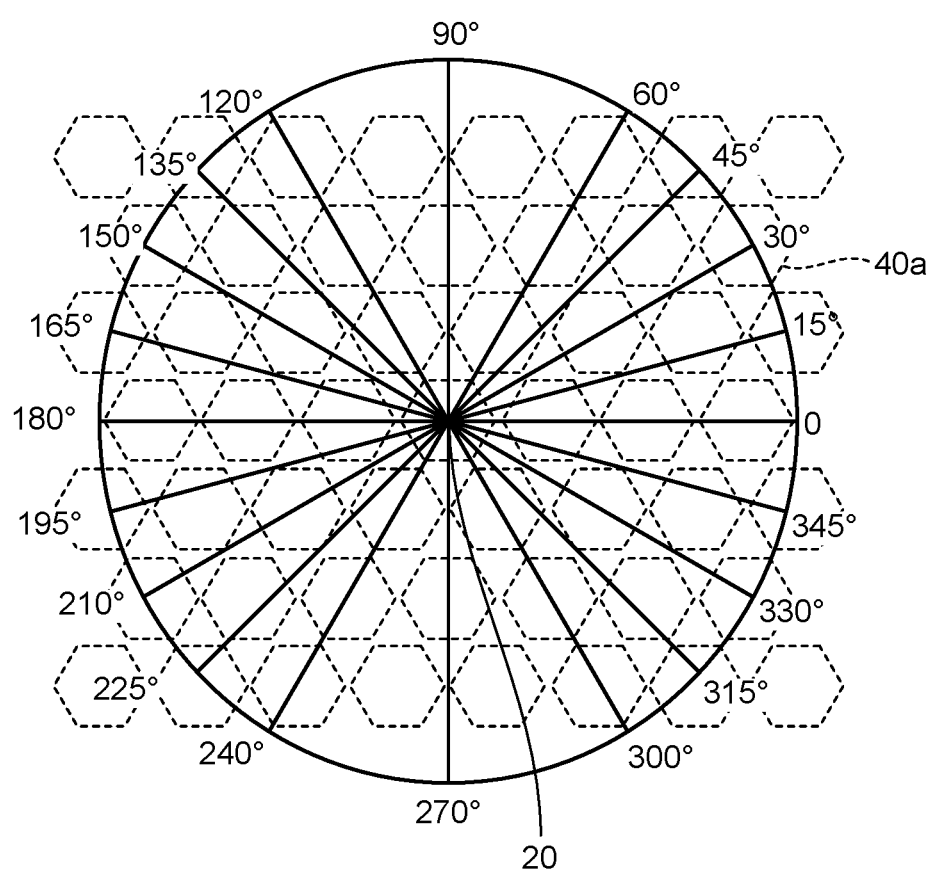
FIG. 8 is a diagram for explaining luminance distributions of the light sources according to the embodiment.

The following describes luminance distributions when the optical element 40 is applied, with reference to FIG. 8. FIG. 8 is a diagram for explaining luminance distributions of the light source 20 according to the embodiment. FIG. 8 illustrates a case in which one light source 20 is arranged at the center position of the first recess 40a. In addition, FIG. 8 illustrates a diffusion of incident light emitted from the light source 20 in the optical element 40 in the range of azimuth angles 0° to 360°.

In the example illustrated in FIG. 8, firstly, in the directions of "0°-180°", "60°-240°", and "120°-300°" (hereinafter, the above-described three directions will be collectively referred to as the first directions), the number of the first recesses 40a in which their centers overlap with the respective axes is larger than that with other axes.

In addition, in the directions of "30°-210°", "90°-270°", and "150°-330°" (hereinafter, the above-described three directions will be collectively referred to as the second directions), the number of the first recesses 40a in which their centers overlap with the respective axes is the next largest.

In addition, in the directions of "15°-195°", "45°-225°", "135°-315°", and "165°-345°" (hereinafter, the above-described four directions will be collectively referred to as the third directions), the number of the first recesses 40a in which their centers overlap with the respective axes is smaller than other axes.

In view of the above, the greatest luminance is on the "axis in 0°-180° direction", the "axis in 60°-240° direction", and the "axis in 120°-300° direction", i.e., these three axes that are each shifted by 60°, where the number of the first recesses 40a is the largest. In addition, the next largest luminance is on three axes that are each shifted by 30° with respect to these three axes. Accordingly, luminance distributions on the emission surface 41b in the lens 4 will have a hexagonal shape.

More specifically, because the light emitted in the first directions has the largest amount of light passing through the centers of the first recesses 40a, luminances of the light emitted from the emission surface 41b will be the highest. More specifically, the luminance distributions of light emitted in the first directions, the second directions, and the third directions have a hexagonal shape on the emission surface 41b.

Furthermore, because the light emitted in the first directions, the second directions, and the third directions is diffused by the first recess 40a and the second recess 40b, luminance distributions in the first directions, the second directions, and the third directions are smoothly linked, and thus the luminance distributions can be made into a uniform hexagonal shape. More specifically, by using the planar lighting device 1 according to the embodiment, the luminance uniformity can be improved.

As described above, the planar lighting device 1 according to the embodiment is provided with the substrate 2 and the lens 4. The plurality of light sources 20 are arranged on the substrate 2. The optical element 40, which has the plurality of first optical parts 40a having parts that taper from the hexagonal-shaped bottom faces toward the tips arranged in a staggered arrangement, is formed on the incident surface 41a opposing the plurality of light sources 20 of the lens 4.

In this manner, because the lens 4, in which the optical elements 40 (the first optical parts 40a) having the fine hexagonal pyramid shapes are arranged with the pitch smaller than the pitch of the plurality of light source 20, integrally covers the light sources 20, alignment of the light source 20 and the lens 4 becomes unnecessary. Thus, luminances of the light-emitting surface can be made uniform without alignment even when a large number of light source 20 are arranged on the substrate 2.

In addition, by arranging the first recesses 40a in a staggered arrangement, the planar lighting device 1 according to the embodiment can allow luminance distributions on the emission surface 41b to have a hexagonal shape. In this manner, because intervals of the light-emitting region of each of the light sources 20 are made narrower, luminances of the light-emitting surface become uniform, and finer contrast control is enabled at the time of local dimming (area light-emitting).

In this manner, in the planar lighting device 1 according to the embodiment, luminance distributions of the light emitted from each of the light sources 20 are made into a hexagonal shape (a polygonal shape having linear sides). Thus, intervals of each of the light-emitting regions are made narrower, and high-density local dimming (area light-emitting) is enabled. In addition, when lighting several of the adjacent light sources 20 (increasing the luminance), or fully lighting the light sources 20 (increasing the luminance), luminances of the light-emitting surface can be made uniform due to the narrow intervals of each of the light-emitting regions. Accordingly, the planar lighting device 1 according to the present embodiment can control contrast more finely at the time of local dimming (area light-emitting), while uniforming luminances of the light-emitting surface.

Furthermore, in the planar lighting device 1 according to the embodiment, light in the part immediately above the light source 20 is spread by refraction with the optical element 40 (the first optical part 40a), and it is possible to prevent the part immediately above the light source 20 from being too bright as compared to the surrounding. Accordingly, by using the planar lighting device 1 according to the embodiment, the luminance uniformity can be improved.

In addition, as described above, in the planar lighting device 1 according to the embodiment, the lens 4, in which the optical elements 40 having the fine hexagonal pyramid-shaped first recesses 40a and trigonal pyramid-shaped second recesses 40b are arranged with the pitch smaller than the pitch of the light source 20, integrally covers the plurality of light sources 20. Thus, alignment of the light source 20 and the lens 4 becomes unnecessary, and luminances of the light-emitting surface can be made uniform without alignment even when a large number of light sources 20 are arranged on the substrate 2.

In addition, by having the lens 4 in which the optical elements 40 having the plurality of hexagonal pyramid-shaped first recesses 40a and trigonal pyramid-shaped second recesses 40b are arranged in a staggered arrangement on the incident surface 41a opposing the light source 20, the planar lighting device 1 according to the embodiment allows luminance distributions of light emitted from each of the light sources 20 to have a hexagonal shape. In other words, on the light-emitting surface, the shape of a light-emitting region corresponding to each of the light sources 20 can be made into a hexagonal shape. In this manner, because intervals of the light-emitting region of each of the light sources 20 are made narrower, luminances of the light-emitting surface become uniform, and finer contrast control is enabled at the time of local dimming (area light-emitting).

In addition, in the planar lighting device 1 according to the embodiment, the plurality of optical elements 40 arranged on the lens 4 include hexagonal pyramid-shaped prisms and trigonal pyramid-shaped prisms that are recessed in the direction away from the plurality of light sources 20. Light emitted from the plurality of light sources 20 is spread by refraction at those prisms, and is emitted from the emission surface 41b of the lens 4. In this manner, it is possible to prevent the part immediately above the light source 20 from being too bright, and luminances of the light-emitting surface can be made uniform in the case of local dimming (area light-emitting) and also in the case of full lighting of the light sources 20 (increasing the luminance).

Furthermore, in the planar lighting device 1 according to the present embodiment, by setting the angle α between the inclined face 40a1 and the bottom face 40a2 of the first recess 40a to 44° or greater and 58° or smaller, light emitted from the light source 20 enters into the lens 4 without being totally reflected when contacting the optical element 40. Because the light emitted from the lens 4 diffuses outwardly, luminances of the light-emitting surface become uniform.

In addition to the configuration of the lens 4 described above, the emission surface 41b may further include a plurality of diffusion elements 44 having convex shapes. This point will be described with reference to FIG. 9.

Figure 9:
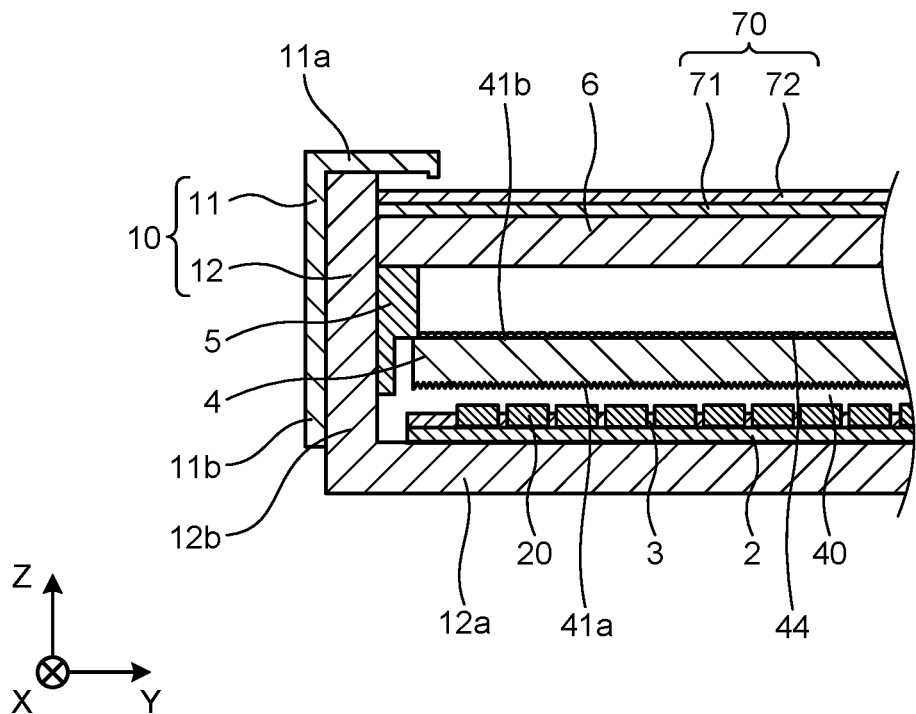
FIG. 9 is a cross-section view of the planar lighting device according to a modification.

FIG. 9 is a cross-section view of the planar lighting device 1 according to a modification. In FIG. 9, configurations that are the same as those in the above-described embodiment are provided with the same reference signs, and descriptions thereof are omitted.

As illustrated in FIG. 9, in the planar lighting device 1 according to the modification, the plurality of diffusion elements 44 are formed on the emission surface 41b, which is the back side of the incident surface 41a. Specifically, on the emission surface 41b of the lens 4, the plurality of diffusion elements 44 (dots) projecting from this emission surface 41b are uniformly provided.

In this manner, in the planar lighting device 1 according to the modification, light also reaches the region immediately above the light source 20 by a diffusion effect due to the plurality of diffusion elements 44, and luminances of the light-emitting surface can be made more uniform.

Furthermore, because the emission surface 41b of the lens 4 is roughened by the plurality of diffusion elements 44, it is possible to prevent the emission surface 41b of the lens 4 from being directly scratched by friction with other members.

Although FIG. 9 illustrates the case in which the diffusion elements 44 are dots, the configuration of the diffusion elements 44 is not limited thereto. Instead of the diffusion elements 44, for example, the surface of the emission surface 41b may be in a rough state. For example, the emission surface 41b that is in a rough state may be formed by shaving with sandblasting. Alternatively, emboss processing may be performed on a mold of the lens 4, and this emboss processing may be transferred to the emission surface 41b.

In addition, not limited to the case in which the emission surface 41b is made into a rough state, the incident surface 41a may be made into a rough state. When making the incident surface 41a into a rough state, the entire incident surface 41a including the optical element 40 may be made into the rough state, or only the optical element 40 in the incident surface 41a may be made into the rough state. Furthermore, in the optical element 40, only at least either of the first optical part 40a and the second optical part 40b may be made into a rough state.

Although the embodiment described above explained the optical sheet 70 in the case in which the first sheet 71 is a prism sheet and the second sheet 72 is a reflection type polarizing sheet, not limited to this, both the first sheet 71 and the second sheet 72 may be prism sheets. This point will be described with reference to FIG. 10.

Figure 10:
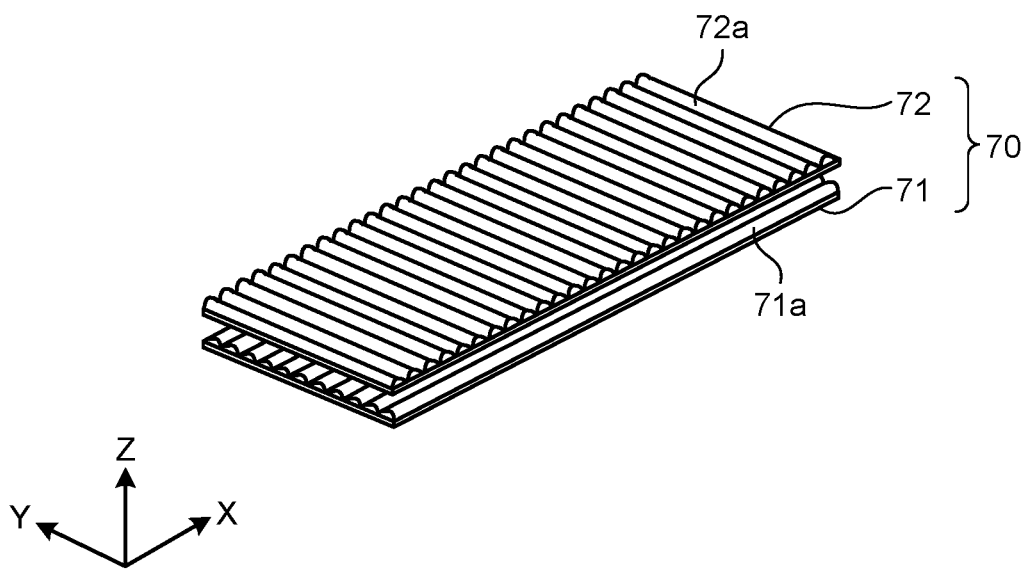
FIG. 10 is an exploded perspective view of an optical sheet according to a modification.

FIG. 10 is an exploded perspective view of the optical sheet 70 according to a modification. As illustrated in FIG. 10, the first sheet 71 and the second sheet 72 are overlappingly arranged.

The first sheet 71 is, for example, a prism sheet, extending in the Y-axis direction, which is the short-length direction (first direction), and it has a plurality of first prisms 71a arranged in parallel in the X-axis direction, which is the longitudinal direction (second direction). In addition, the second sheet 72 is, for example, a prism sheet, extending in the X-axis direction, which is the longitudinal direction, and it has second prisms 72a arranged in parallel in the Y-axis direction, which is the longitudinal direction.

The first prisms 71a and the second prisms 72a are projecting parts that project toward the light emission direction side, which is the Z-axis positive direction side. In addition, the first prisms 71a and the second prisms 72a have, for example, triangular shapes in cross-section view. Furthermore, the positional relation between the first prisms 71a and the second prisms 72a is such that the extending directions are orthogonal to each other.

The first prisms 71a condense emitting light in the Y-axis direction. In addition, the second prisms 72a condense the light emitted from the first prisms 71a in the X-axis direction. More specifically, the light emitted through the first prisms 71a and the second prisms 72a is condensed in a specific direction. In this manner, because the light can be condensed in the specific direction, light distribution in the specific direction can be controlled by the first sheet 71 and the second sheet 72.

The first prisms 71a and the second prisms 72a are not necessarily arranged so as to be orthogonal (intersect at 90°), and an optional intersection angle may be set in accordance with required light distribution characteristics.

In addition, not limited to the embodiment described above, for example, the lens 4 may be formed by being divided. In that case, the plurality of light sources 20 are arranged such that gaps between the plurality of lenses 4 are not positioned at the parts immediately above the light sources 20. In this manner, light can be guided to parts immediately above the gaps by refraction at the optical elements 40 of the lenses 4, and thus it is possible to prevent luminance of the regions in the gaps from being lowered. More specifically, by using the lens 4 according to the embodiment, it is possible to prevent the gaps between the lenses 4 from appearing as dark regions, and thus the luminance uniformity can be improved.

Figure 11:
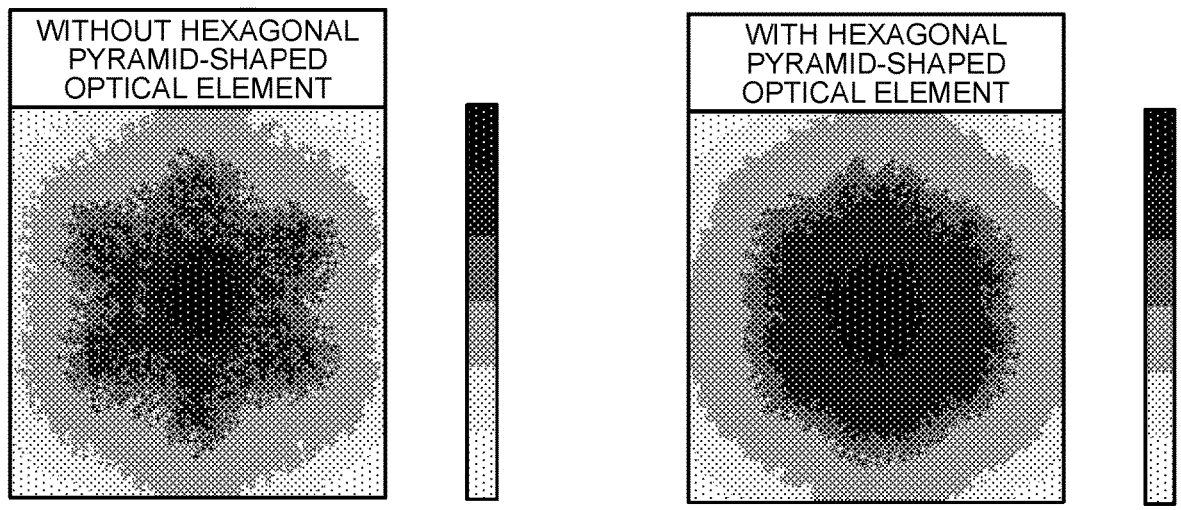
FIG. 11 is a (first) diagram illustrating a comparison result of luminance distributions between the presence and the absence of the optical element according to the embodiment.
Figure 12:
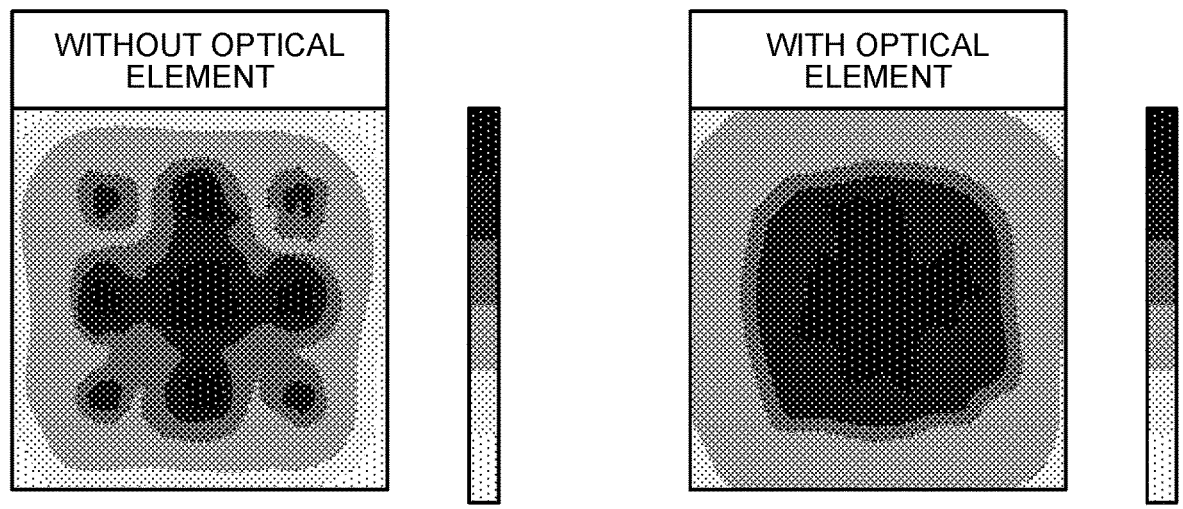
FIG. 12 is a (second) diagram illustrating a comparison result of luminance distributions between the presence and the absence of the optical element according to the embodiment.

The following describes a simulation result indicating luminance distributions of the planar lighting device 1 according to the embodiment, with reference to FIG. 11 and FIG. 12. FIG. 11 is a (first) diagram illustrating a comparison result of luminance distributions between the presence and the absence of the optical element 40 according to the embodiment. FIG. 12 is a (second) diagram illustrating a comparison result of luminance distributions between the presence and the absence of the optical element 40 according to the embodiment. Luminances are indicated with tones in FIG. 11 and FIG. 12, and darker tones indicate that the luminances are stronger (brighter).

First, a simulation result of luminance distributions in the case in which seven light sources 20 arranged in a staggered arrangement are lighted (seven lightings), is described with reference to FIG. 11.

As illustrated in FIG. 11, in a planar lighting device that is provided with a lens not having an optical element, which is a comparative example, the link of luminance distributions among the light sources is not smooth. In contrast, in the planar lighting device 1, which is provided with the lens 4 having the optical element 40, the link of luminance distributions among the light sources 20 is smooth. Thus, from the simulation result, it can be understood that the luminance uniformity improves by using the lens 4 having the optical element 40, in the case of the light sources 20 that are arranged in a staggered arrangement. In other words, when comparing luminance distributions in a planar lighting device that is provided with a lens in which the optical element 40 is not arranged, with that of the planar lighting device 1 according to the embodiment, it can be understood that luminance distributions among the light sources 20 are more smoothly linked in the planar lighting device 1, and luminance distributions having a clear hexagonal shape can be obtained.

In addition, as illustrated in FIG. 11, the shape of luminance distributions is an approximately hexagonal shape in the planar lighting device 1, which is provided with the lens 4 having the optical element 40. In other words, because luminance distributions of light emitted from the light sources 20 have a hexagonal shape (a polygonal shape having linear sides), and intervals of each of the light-emitting regions are made narrower, in the planar lighting device 1 according to the embodiment, luminances of the light-emitting region can be made uniform, and contrast can be controlled more finely at the time of local dimming (area light-emitting).

The following describes a simulation result of luminance distributions in the case in which nine light sources 20 arranged in a rectangular arrangement are lighted (nine lightings), with reference to FIG. 12.

As illustrated in FIG. 12, the link of luminance distributions among the light sources is not smooth in a planar lighting device that is provided with a lens not having an optical element, which is a comparative example, whereas the link of luminance distributions among the light sources 20 is smooth in the planar lighting device 1, which is provided with the lens 4 having the optical element 40. Thus, from the simulation result, it can be understood that the luminance uniformity can be improved by using the lens 4 having the optical element 40, in the case of the light sources 20 arranged in a rectangular arrangement.

In addition, as illustrated in FIG. 12, when the light sources 20 are arranged in a rectangular arrangement, the shape of luminance distributions is an approximately rectangular shape in the planar lighting device 1, which is provided with the lens 4 having the optical element 40. This is because, although luminance distributions of light emitted from the light sources 20 have a hexagonal shape in the planar lighting device 1 according to the embodiment, when the light sources 20 are arranged in a rectangular arrangement, the hexagonal-shaped luminance distributions of the light emitted from the light sources 20 overlap with one another, and the luminance distributions will have an approximately rectangular shape as a whole. That is to say, when the light sources 20 are arranged in a rectangular arrangement, because the hexagonal-shaped luminance distributions overlap with one another in the planar lighting device 1 according to the embodiment, luminances of the light-emitting region can be made uniform, and contrast can be controlled more finely at the time of local dimming (area light-emitting).

Figure 13:
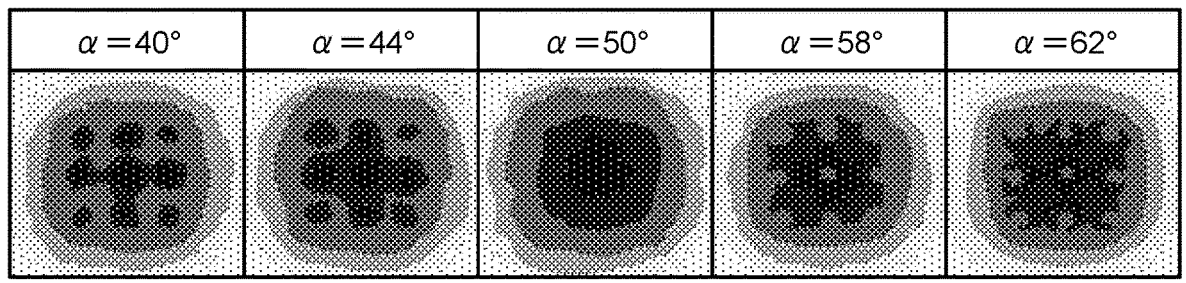
FIG. 13 is a diagram illustrating a comparison result of luminance distributions due to differences in angles of the optical element.
Figure 13:

The following describes differences in luminance distributions due to differences in the angle α of the first optical part 40a, with reference to FIG. 13. FIG. 13 is a diagram illustrating comparison results of luminance distributions due to the differences in the angle α of the first optical part 40a. FIG. 13 illustrates luminance distributions when the angle α is in the angular range from 40° to 62°, specifically, at 40°, 44°, 50°, 58°, and 62°. In addition, FIG. 13 illustrates luminance distributions when lighting all the nine light sources 20 arranged in a rectangular arrangement (at the time of nine lightings).

As illustrated in FIG. 13, when the angle α is in the angular range from 40° to 62°, the highest luminance uniformity is at 50°. In addition, the next highest luminance uniformity is at 44° and 58°, and the lowest luminance uniformity is at 40° and 62°.

In other words, with regard to the optical element 40, the luminance uniformity becomes higher as the angle α of the first optical part 40a gets closer to 50°. In addition, when the angle α is in the range from 44° to 58°, light emitted from the light source 20 enters into the optical element 40 of the lens 4, and the light is emitted while being spread by refraction. Thus, luminance unevenness is less likely to become apparent. More specifically, the angle α of the first optical part 40a is preferably 44° or greater and 58° or smaller, and more preferably, is 50°. By designing the angle α in this range, luminances can be made uniform.

Figure 14:
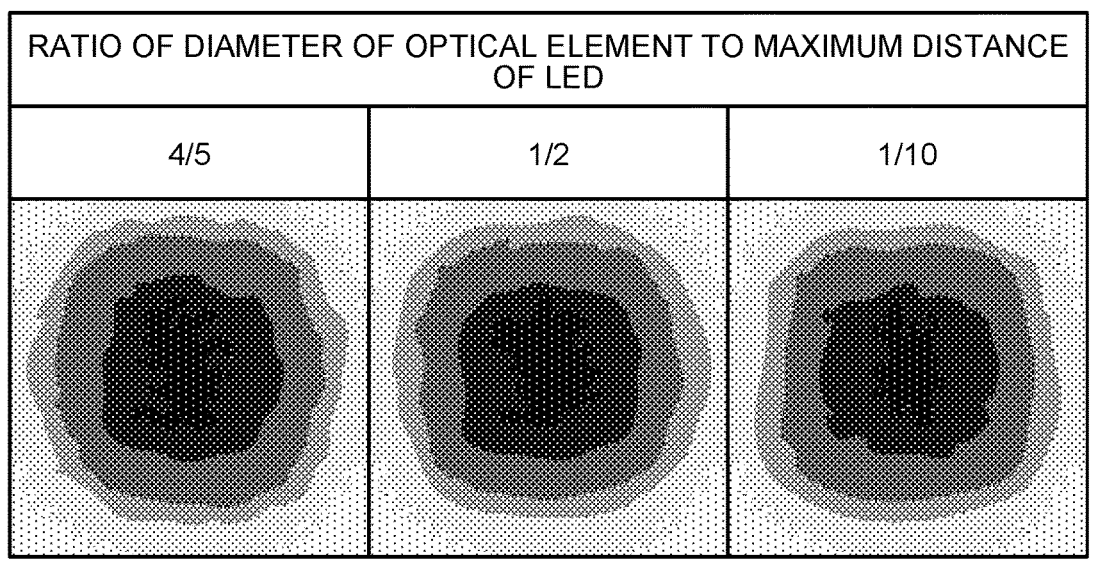
FIG. 14 is a diagram illustrating a comparison result of luminance distributions due to differences in lengths of the optical element.
Figure 14:
Figure 15:
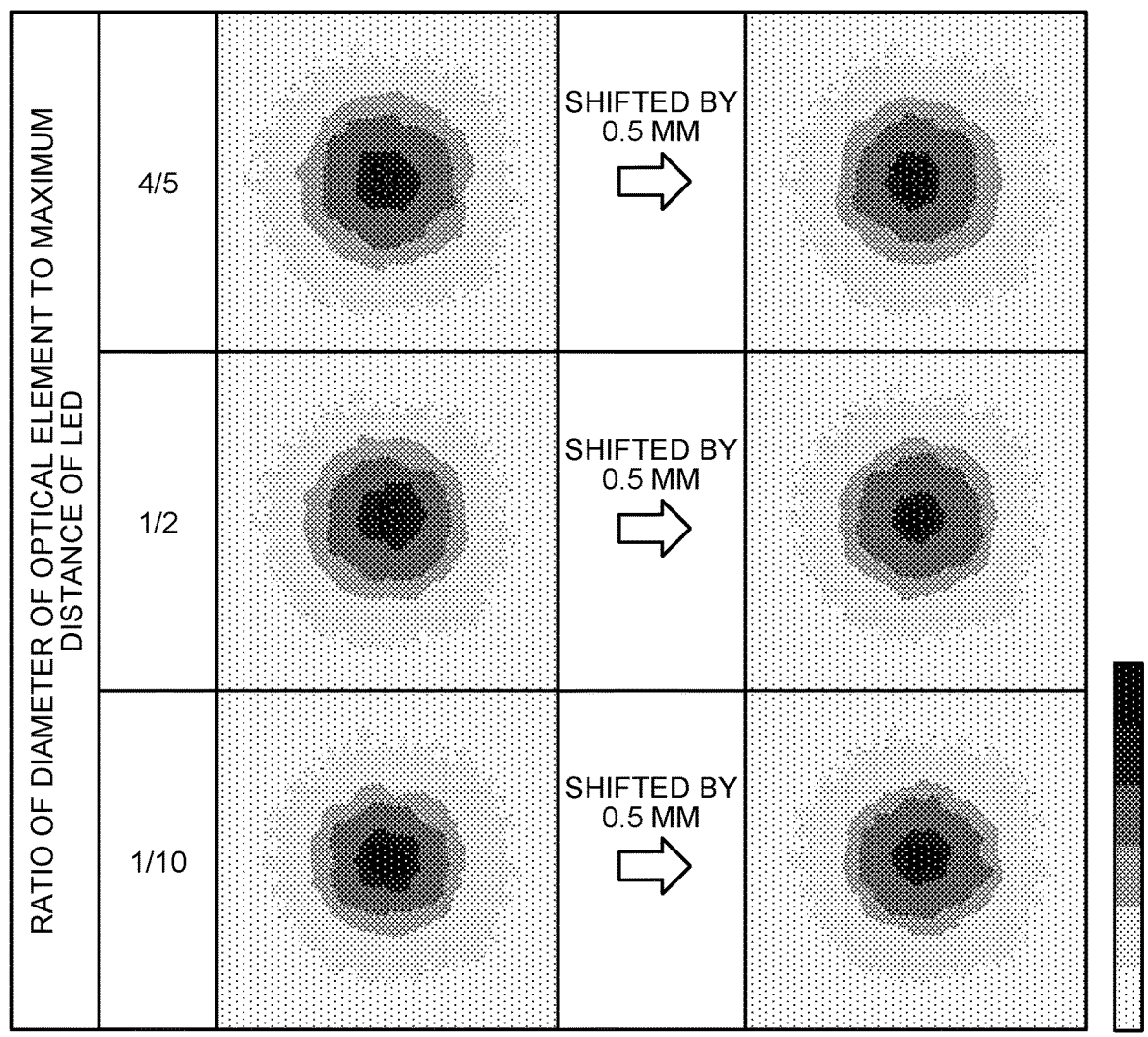
FIG. 15 is a diagram illustrating a comparison result of luminance distributions due to displacement of the lens according to the embodiment.

The following describes differences in luminance distributions due to differences in the length D of the first optical part 40a, with reference to FIG. 14 and FIG. 15. FIG. 14 is a diagram illustrating comparison results of luminance distributions due to the differences in the length D of the first optical part 40a. FIG. 15 is a diagram illustrating comparison results of luminance distributions due to displacement of the lens 4 according to the embodiment. In addition, FIG. 14 illustrates luminance distributions when all nine light sources 20 arranged in a rectangular arrangement are lighted (at the time of nine lightings). Furthermore, FIG. 15 illustrates luminance distributions when one light source 20 is lighted (at the time of one lighting).

FIG. 14 and FIG. 15 illustrate ratios of the length D of the first optical part 40a with respect to the maximum distance (the length D20 between the opposing corners) of the light source 20 (LED). For example, "½" indicates that the length D of the first optical part 40a is half the length D20 (see FIG. 4C) of the light source 20.

As illustrated in FIG. 14, the luminance uniformity is the highest in the case of "1/10", and the luminance uniformity gets higher in the order of "½" and "⅘". In other words, as the length D of the first optical part 40a gets shorter, the luminance uniformity gets higher. In addition, luminance unevenness is less likely to become apparent in the case of "½". More specifically, the length D of the first optical part 40a is preferably half or shorter than the maximum distance of the light source 20 in top view, and more preferably, is one tenth or shorter. By designing the first optical part 40a to have such length D, luminances can be made uniform.

In addition, as illustrated in FIG. 15, for example, when the lens 4 is shifted (displaced) by 0.5 mm with respect to the light source 20, the luminance distributions are changed due to the displacement in the case of "⅘". In other words, "⅘" indicates that the appearance does not become uniform due to the displacement between the light source 20 and the lens 4.

On the other hand, in the cases of "½" and "1/10", there is an extremely small change in the luminance distributions even when the lens 4 is shifted by 0.5 mm with respect to the light source 20. Furthermore, the change in the luminance distributions is even smaller in "1/10" than in "½". More specifically, the length D of the first optical part 40a is preferably half or shorter than the maximum distance of the light source 20 in top view, and more preferably, is one tenth or shorter. In other words, because the displacement between the light source 20 and the lens 4 can be substantially ignored in the cases of "½" and "1/10", luminances can be made uniform even when the displacement between the light source 20 and the lens 4 occurs due to, for example, vibration or thermal expansion (shrinkage) of the lens 4.

Figure 16A:
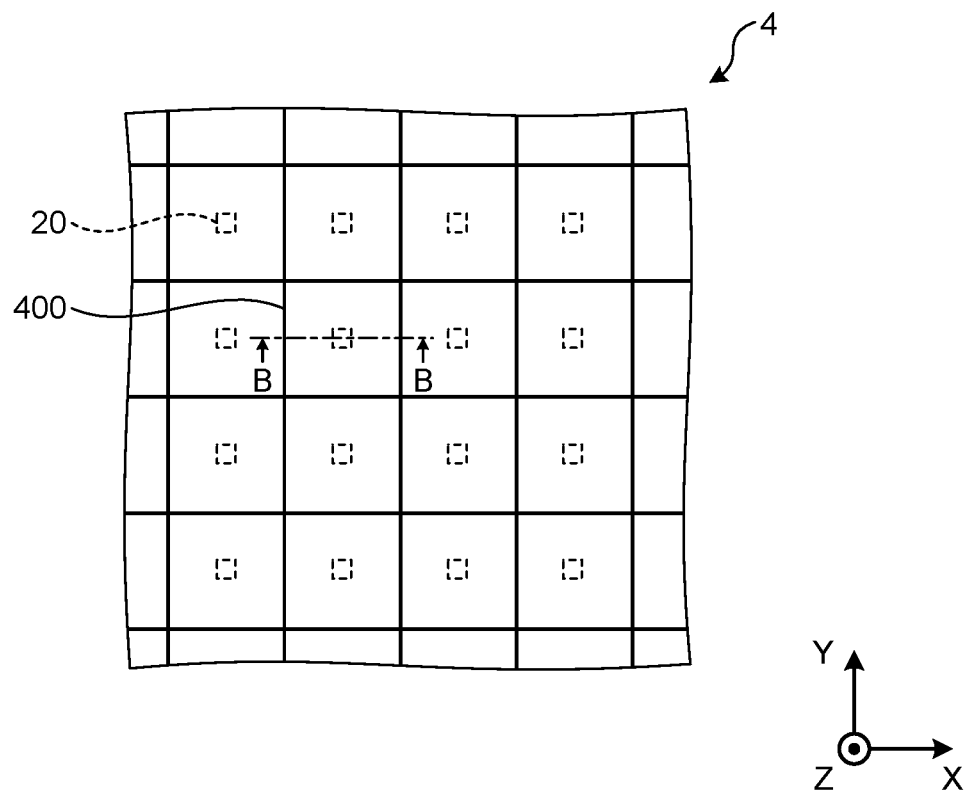
FIG. 16A is a top view of the lens according to a modification.
Figure 16B:
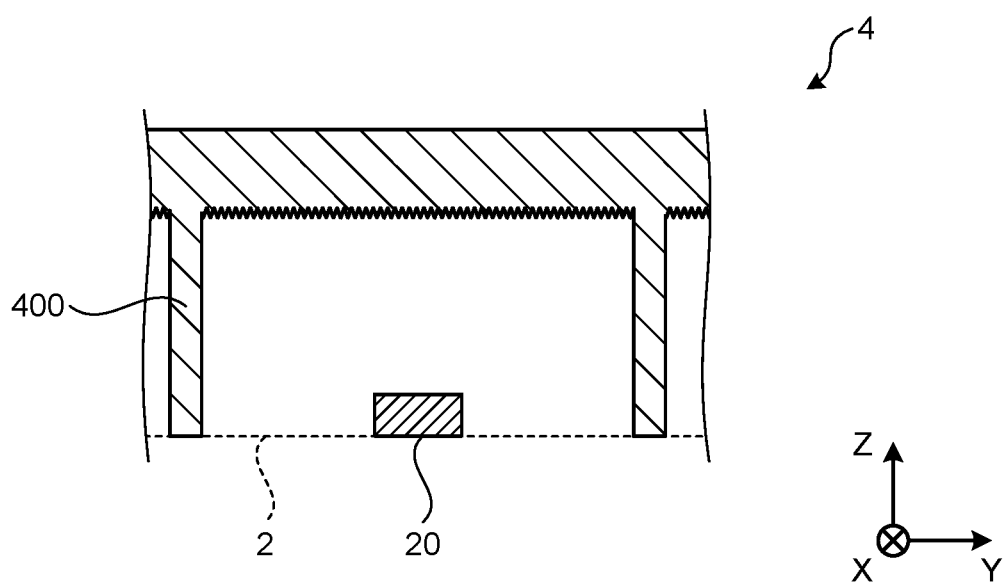
FIG. 16B is a cross-section view at a line B-B in FIG. 16A.

The lens 4 according to the embodiment described above may have legs for supporting the lens 4. The legs of the lens 4 are described with reference to FIGS. 16A and 16B. FIG. 16A is a top view of the lens 4 according to a modification. FIG. 16B is a cross-section view at a line B-B in FIG. 16A. FIG. 16A illustrates a case in which the plurality of light sources 20 are arranged in a rectangular arrangement.

As illustrated in FIG. 16A and FIG. 16B, the lens 4 has legs 400 that project toward the substrate 2 side, on the incident surface 41a. The lens 4 is supported by the substrate 2 via the legs 400. In this manner, a regular interval between the lens 4 and the light source 20 can be maintained. In addition, because the regular interval between the lens 4 and the light source 20 can be easily maintained, productivity can also be improved. Furthermore, by maintaining the regular interval between the lens 4 and the light source 20 using the legs 400, luminances can be made uniform. The lens 4 may also be fixed to the substrate 2 via the legs 400.

In addition, as illustrated in FIG. 16A and FIG. 16B, the legs 400 extend in a lattice state (X-axis direction and Y-axis direction) so as to individually surround the plurality of light sources 20. In this manner, entrance of light of the adjacent light sources 20 can be prevented, and contrast can be improved at the time of local dimming (area light-emitting).

Although FIG. 16A and FIG. 16B illustrate a case in which the lens 4 and the legs 400 are integrally formed, the lens 4 and the legs 400 may be separately formed. Alternatively, the legs 400 and the substrate 2 may be integrally formed.

In addition, when integrally forming the lens 4 and the legs 400, a function as a reflection part may be provided to the legs 400 by making the surface of the legs 400 into a rough state.

In addition, although FIG. 16A illustrates the case in which the plurality of light sources 20 are arranged in a lattice arrangement, for example, when the plurality of light sources 20 are arranged in a staggered arrangement, the legs 400 individually surround the plurality of light sources 20 by extending in a staggered arrangement.

Although the embodiment described above describes the case in which the first recess 40a and the second recess 40b are in pyramid shapes (shapes with sharp tips), the tip shapes of the first recess 40a and the second recess 40b do not have to be sharpened. For example, the tip shapes of the first recess 40a and the second recess 40b may have shapes as illustrated in FIG. 17A to FIG. 17D.

FIG. 17A to FIG. 17D are diagrams illustrating the tip shape of the first recess 40a according to modifications. Although FIG. 17A to FIG. 17D illustrate the tip shape of the first recess 40a, the second recess 40b may have tip shapes as illustrated in FIG. 17A to FIG. 17D.

Figure 17A:
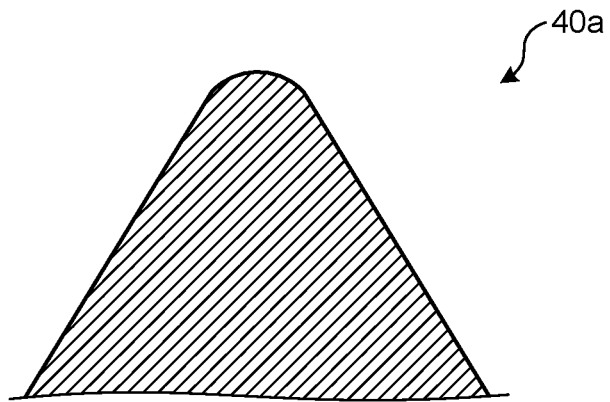
FIG. 17A is a diagram illustrating a tip shape of the first recess according to a modification.
Figure 17B:
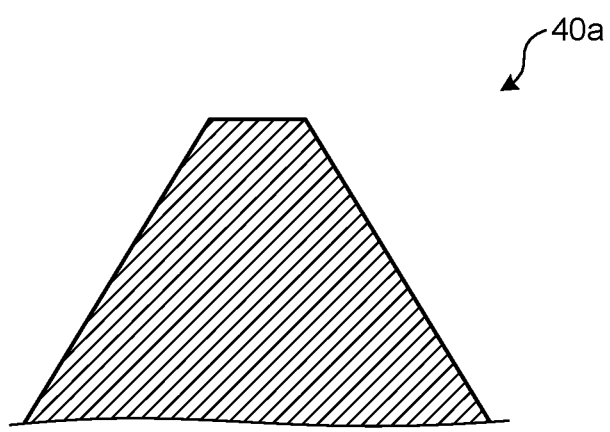
FIG. 17B is a diagram illustrating a tip shape of the first recess according to a modification.

As illustrated in FIG. 17A, for example, the tip shape of the first recess 40a may have an arc shape. In addition, as illustrated in FIG. 17B, the tip shape of the first recess 40a may be a planar shape. This planar shape may be, for example, the same hexagonal shape as the bottom face 40a2 of the first recess 40a, or may be a polygon other than the hexagonal shape or a circle.

Figure 17C:
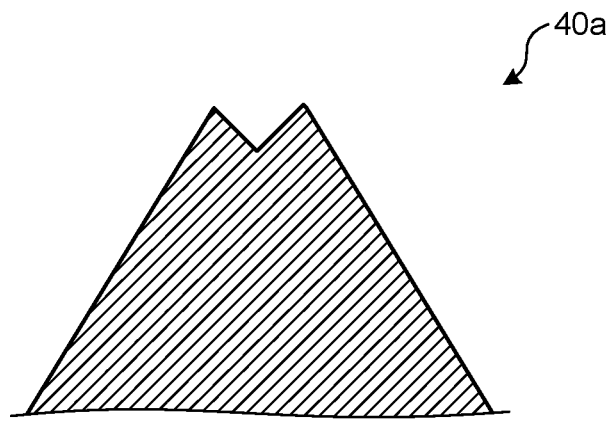
FIG. 17C is a diagram illustrating a tip shape of the first recess according to a modification.
Figure 17D:
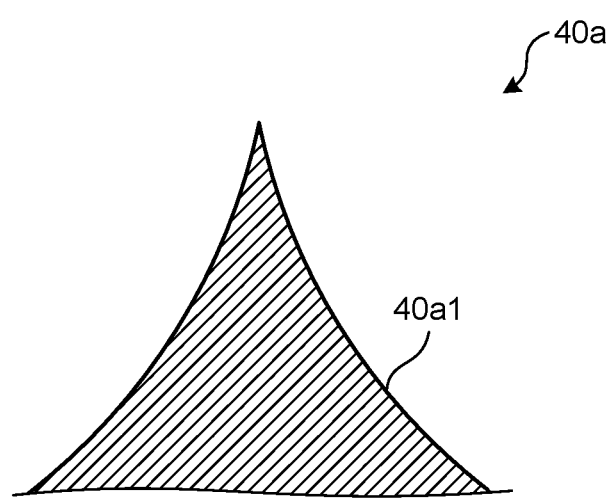
FIG. 17D is a diagram illustrating a tip shape of the first recess according to a modification.

In addition, as illustrated in FIG. 17C, the tip shape of the first recess 40a may be a recess. Furthermore, as illustrated in FIG. 17D, the inclined face 40a1 of the first recess 40a may be an arc that is a concave shape. The inclined face 40a1 may also be an arc that is a convex shape.

Besides the tip shapes of the first recess 40a illustrated in FIG. 17A to FIG. 17D, an optional shape may be applied. In other words, the tip shape of the first recess 40a may have an optional shape as long as that shape has a part that tapers from the bottom face 40a2 to the tip.

Although the embodiment described above describes the case in which the optical sheet 70 includes the first sheet 71 and the second sheet 72, the optical sheet 70 may include three sheets. This point will be described with reference to FIG. 18 to FIG. 20.

Figure 18:
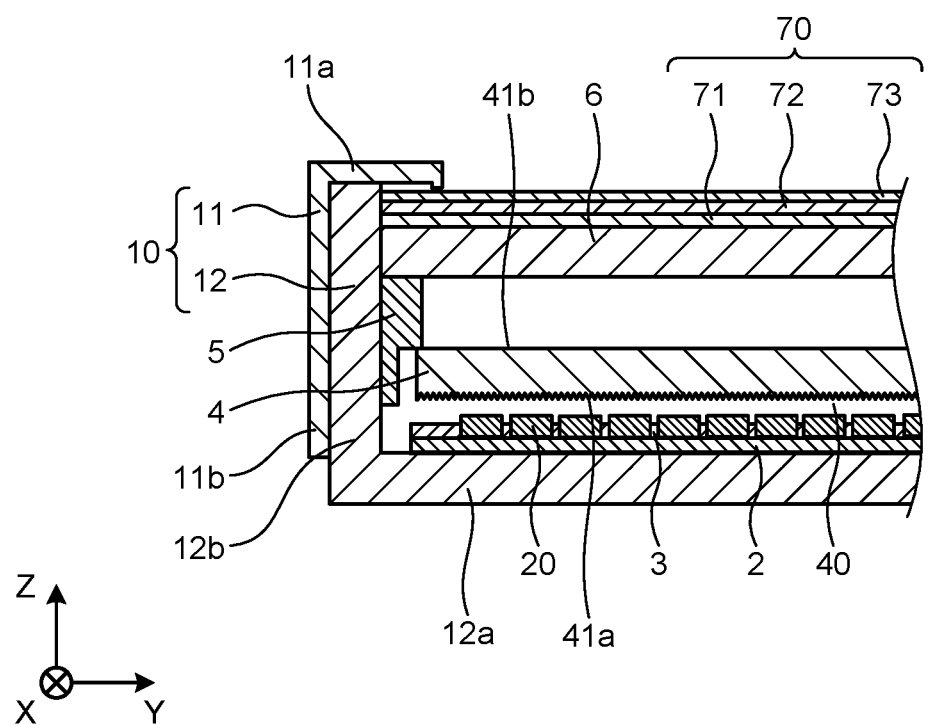
FIG. 18 is a cross-section view of the planar lighting device according to a modification.
Figure 19A:
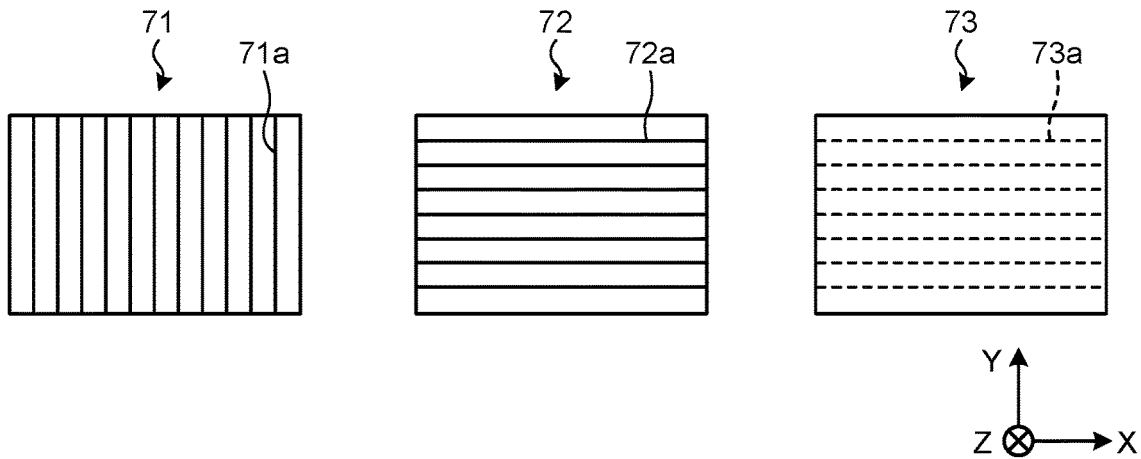
FIG. 19A is a diagram illustrating a configuration of the optical sheet according to a modification.
Figure 19B:
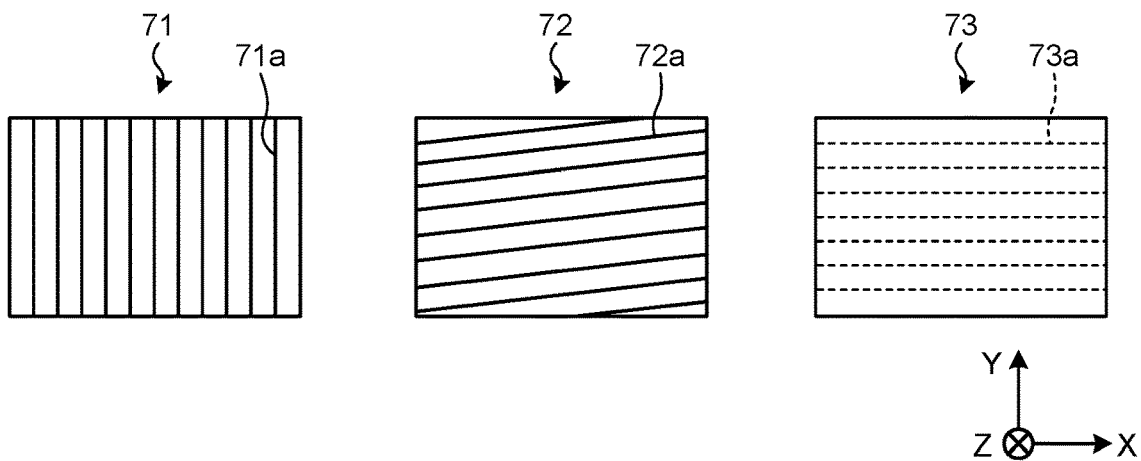
FIG. 19B is a diagram illustrating a configuration of the optical sheet according to a modification.
Figure 19C:
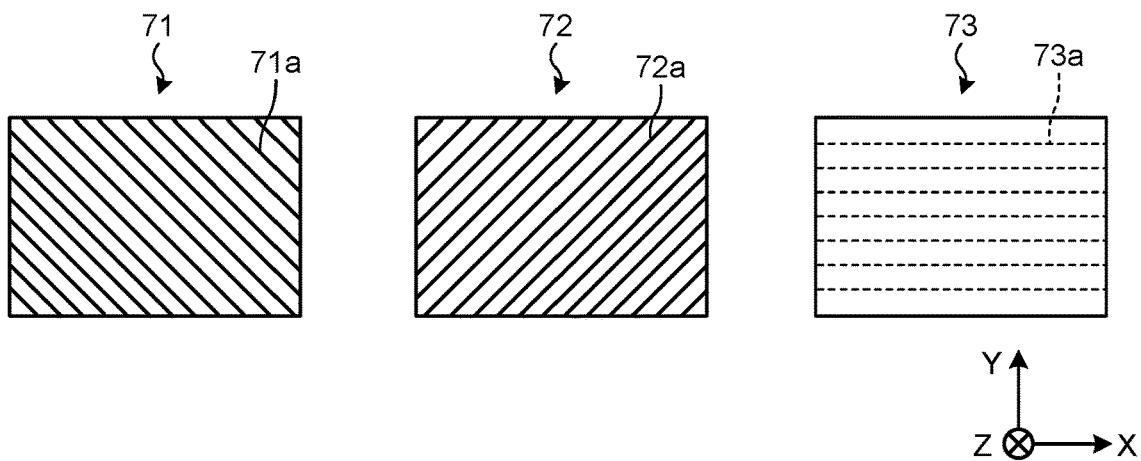
FIG. 19C is a diagram illustrating a configuration of the optical sheet according to a modification.
Figure 20:
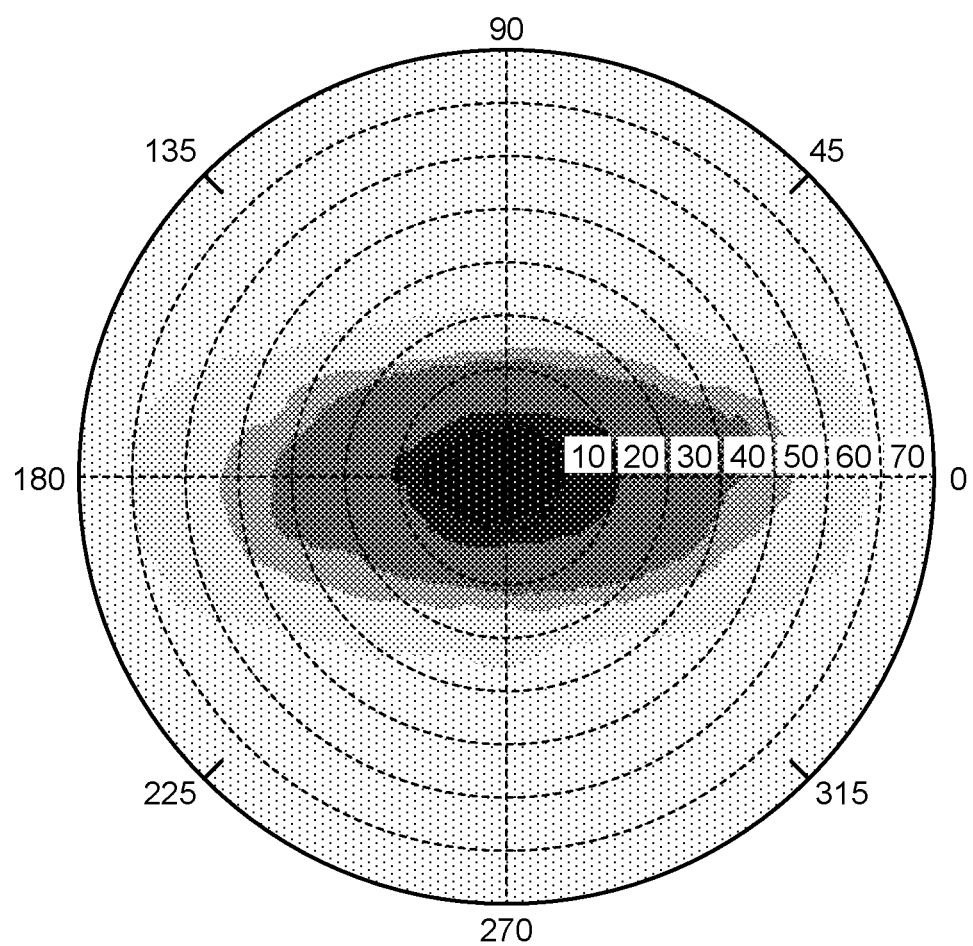
FIG. 20 is a diagram illustrating light distribution characteristics when the optical sheet according to a modification is provided.

FIG. 18 is a cross-section view of the planar lighting device 1 according to a modification. FIG. 19A to FIG. 19C are diagrams illustrating the configuration of the optical sheet 70 according to a modification. FIG. 20 is a diagram illustrating light distribution characteristics when providing the optical sheet 70 according to a modification. FIG. 20 illustrates luminances of light emitted in a polar coordinates system in which a deflection angle is in the range of 0° to 80°, wherein darker tones indicate stronger (brighter) luminances.

As illustrated in FIG. 18, the optical sheet 70 includes, for example, three sheets. Specifically, the optical sheet 70 includes the first sheet 71, the second sheet 72, and a third sheet 73. Because the configurations of the first sheet 71 and the second sheet 72 are the same as those in the embodiment described above, descriptions thereof will be omitted.

The third sheet 73 is a sheet-like member that is arranged on the light emission direction side, which is the Z-axis positive direction side, of the second sheet 72. For example, it is a member having a reflection type polarizing sheet and a louver film that are integrally formed, such as an advanced light control film (ALCF) manufactured by the 3M company. For example, in louvers 73a of the third sheet 73, light cutoff is preferably 45° or smaller. In addition, the third sheet 73 is arranged distant from the lens 4, as compared with the first sheet 71 and the second sheet 72.

In addition, the third sheet 73 is a member in which the positional relation of the extending direction (third direction) of the louvers 73a (optical elements) of the louver film is defined by the extending direction (first direction) of the first prisms 71a, and the extending direction (second direction) of the second prisms 72a. The reflection type polarizing sheet of the third sheet 73 may extend in an optional direction regardless of the first prisms 71a and the second prisms 72a. FIG. 19A to FIG. 19C illustrate the positional relations of the louvers 73a, the first prisms 71a, and the second prisms 72a.

The positional relations illustrated in FIG. 19A will be described. In the example illustrated in FIG. 19A, the first prisms 71a extend in the Y-axis direction, the second prisms 72a extend in the X-axis direction, and the louvers 73a extend in the X-axis direction.

In other words, the louvers 73a are approximately orthogonal to the first prisms 71a, and are approximately parallel to the second prisms 72a. In this manner, as illustrated in FIG. 20, when the light distribution characteristics are three-dimensionally expressed in a polar coordinates system, emitted light with a deflection angle that is higher than a predetermined angle (in FIG. 20, approximately 45°) can be cut off. In other words, spread of emitted light in the longitudinal direction and the short-length direction of the planar lighting device 1 can be suppressed. Accordingly, for example, when the planar lighting device 1 is applied to on-board devices, glares on a windshield or side window glass can be suppressed.

In addition, for example, as illustrated in FIG. 19B, the second prisms 72a may be rotated in the rotation direction by a predetermined angle from the X-axis direction. In other words, as illustrated in FIG. 19B, the second prisms 72a are displaced from the positions approximately orthogonal to the first prisms 71a by a rotation angle. In addition, the second prisms 72a are displaced from the positions approximately parallel to the louvers 73a by a rotation angle. The rotation angle is, for example, preferably ±20° or smaller. Such a configuration can also suppress the spread of emitted light in the longitudinal direction and the short-length direction of the planar lighting device 1, as in the case of the positional relation in FIG. 19A described above. Accordingly, for example, when the planar lighting device 1 is applied to on-board devices, glares on a windshield or side window glass can be suppressed.

In addition, for example, as illustrated in FIG. 19C, the first prisms 71a and the second prisms 72a may be rotated approximately 45° while maintaining an orthogonal relation with each other. Specifically, the first prisms 71a are rotated just approximately 45° in the rotation direction (for example, counterclockwise rotation) from the Y-axis direction. In addition, the second prisms 72a are rotated just approximately 45° in the rotation direction (for example, counterclockwise rotation) from the X-axis direction. Furthermore, the louvers 73a extend in the X-axis direction. In other words, the louvers 73a are arranged by being displaced approximately 45° with respect to the first prisms 71a and the second prisms 72a. As in the case of the positional relations in FIG. 19A and FIG. 19B described above, the spread of emitted light in the longitudinal direction and short-length direction of the planar lighting device 1 can be suppressed. Accordingly, for example, when the planar lighting device 1 is applied to on-board devices, glares on a windshield or side window glass can be suppressed.

Although the example illustrated in FIG. 19C describes the case in which the first prisms 71a and the second prisms 72a are rotated approximately 45°, the rotation angle can be set to ±60° or smaller as long as the orthogonal relation between the first prisms 71a and the second prisms 72a is maintained.

In addition, although FIG. 19A to FIG. 19C illustrate the case in which the louvers 73a extend approximately parallel to the X-axis direction, the louver 73a may be rotated by a predetermined angle in the rotation direction from the X-axis direction. In this case, the rotation angle of the louvers 73a is preferably ±10° or smaller.

In addition, although the case in which the reflection type polarizing sheet and the louver film are integrally formed in the third sheet 73 was described above, the reflection type polarizing sheet and the louver film may be separately formed in the third sheet 73.

Figure 21A:
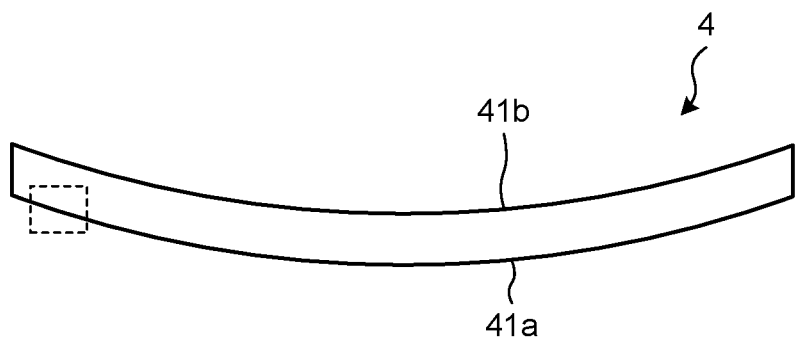
FIG. 21A is a side view of the lens according to a modification.
Figure 21A:
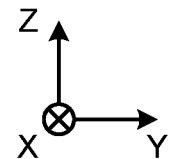
Figure 21B:
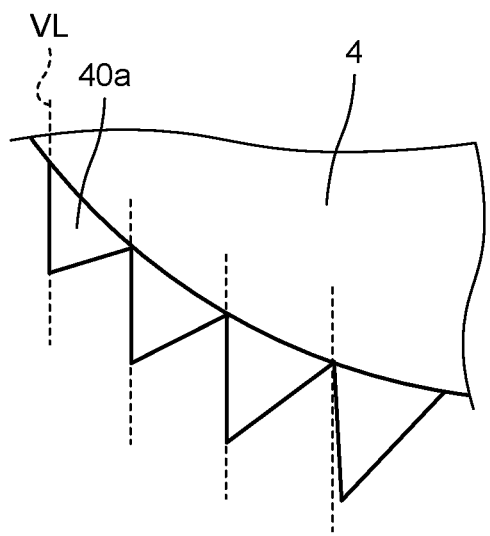
FIG. 21B is an enlarged view of a first optical part according to a modification.
Figure 21B:
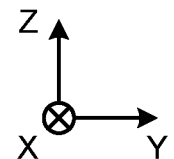

Although the embodiment above describes the case in which the lens 4 is a flat surface, the lens 4 may be a curved surface. This point will be described with reference to FIG. 21A and FIG. 21B. FIG. 21A is a side view of the lens 4 according to a modification. FIG. 21B is an enlarged view of the first optical part 40a according to the modification. FIG. 21A and FIG. 21B illustrate a case in which the first optical part 40a has a convex shape. In addition, FIG. 21B illustrates an enlarged view of the region surrounded by the broken line illustrated in FIG. 21A.

As illustrated in FIG. 21A, the lens 4 has a curved surface shape that is bent in the Z-axis direction. Specifically, the lens 4 has a curved surface shape in which the incident surface 41a has a convex shape and the emission surface 41b has a concave shape. R of the lens 4, which has a curved surface shape, can be set within the range where the angle α (see FIG. 4C) of the first recess 40a becomes approximately 44° or greater and 58° or smaller.

In addition, as illustrated in FIG. 21B, when the lens 4 has a curved surface shape, the first optical part 40a preferably has an asymmetrical shape in side view. Specifically, the first optical part 40a has a shape that is inwardly (the central side of the lens 4) directed with respect to a virtual vertical line VL that is parallel to the Z-axis direction. More specifically, in the first optical part 40a, the apex of the hexagonal pyramid is positioned inside the vertical line VL. In other words, because the first optical part 40a is inwardly directed with respect to the vertical line VL, when pulling out the mold in the Z-axis negative direction, it is possible to prevent the first optical part 40a from being caught by the mold. Accordingly, by making the lens 4 into a curved surface shape, workability when pulling out the first optical part 40a from the mold can be improved.

Although the lens 4 has a curved surface shape that is convex on the Z-axis negative direction side in FIG. 21A, it may have a curved surface shape that is convex on the Z-axis positive direction side. In this case, the first optical part 40a preferably has a shape that is outwardly (peripheral end side of the lens 4) directed with respect to the vertical line VL.

According to an aspect of the present invention, luminance uniformity can be improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A planar lighting device, comprising:
   a substrate on which a plurality of light sources are arranged;
   a lens that is formed to have, on an incident surface opposing a common light emission direction of the plurality of light sources, an optical element having a plurality of first optical parts that include a part that tapers from a bottom face of each of the first optical parts; and
   a diffusion plate that diffuses light of each of the light sources, wherein
   the lens is arranged between and distant from each of the diffusion plate and the light source at a position in which a distance from the incident surface to the diffusion plate is longer than a distance from the incident surface to the light source, and
   a length between opposite sides in the bottom face of each of the first optical parts is half or shorter than a maximum width of a single light source of each of the plurality of light sources as viewed from a top view of the plurality of light sources into the common light emission direction of the plurality of light sources.

2. The planar lighting device according to claim 1, wherein in the optical element, an angle between the bottom face and an inclined face that intersects with the bottom face is 44° or greater and 58° or smaller.

3. The planar lighting device according to claim 1, wherein in the optical element, an angle between the bottom face and an inclined face that intersects with the bottom face is 44° or greater and 55° or smaller.

4. The planar lighting device according to claim 1, wherein the lens is formed to have the optical element that further has a plurality of second optical parts that include a part that tapers from a bottom face having a triangular shape to a tip, the second optical parts being adjacent to the corresponding first optical part.

5. The planar lighting device according to claim 1, further comprising an optical sheet arranged on an emission surface side of the lens, wherein
   the optical sheet includes a first sheet having a plurality of optical elements extending in a first direction and a second sheet having a plurality of optical elements extending in a second direction intersecting with the first direction.

6. The planar lighting device according to claim 5, wherein
   the optical sheet further includes a third sheet having a plurality of optical elements extending in a third direction, the third sheet being arranged distant from the lens as compared with the first sheet and the second sheet, and
   the third direction is defined by the first direction and the second direction.

7. The planar lighting device according to claim 1, wherein the lens has, on an emission surface that is the back side of the incident surface, a plurality of diffusion elements projecting from the emission surface.

8. A planar lighting device, comprising:
   a substrate on which a plurality of light sources are arranged;
   a lens that is formed to have, on an incident surface opposing the plurality of light sources, an optical element having a plurality of optical parts that include a part that tapers from a bottom face; and
   a diffusion plate that diffuses light of each of the light sources, wherein
   the lens is arranged between the diffusion plate and the light source and arranged at a position in which a distance from the incident surface to the diffusion plate is longer than a distance from the incident surface to the light source, and no member that performs an optical adjustment is disposed between the lens and the diffusion plate in an emission region.

9. A planar lighting device, comprising:

a substrate on which a plurality of light sources are arranged; and a lens that is formed to have, on an incident surface opposing a common light emission direction of the plurality of light sources, an optical element having a plurality of first optical parts that include a part that tapers from a bottom face of each of the first optical parts, wherein the first optical parts are aligned in a manner that both of a ridgeline of one of the first optical parts and a ridgeline of another of the first optical parts adjacent to the one of the first optical parts are in a straight line, and one direction, in which the light sources being arranged in the lattice arrangement are aligned, coincides with one of the straight lines in which the first optical parts are aligned.

10. The planar lighting device according to claim 1, wherein no member that performs an optical adjustment is disposed between the lens and the diffusion plate in an emission region.

11. The planar lighting device according to claim 1, wherein a length between opposite sides in the bottom face of each of the first optical parts is one-tenth or shorter than a maximum width of a single light source of each of the plurality of light source as viewed along a light emission direction.

12. The planar lighting device according to claim 8, wherein a length between opposite sides in the bottom face of each of the first optical parts is one-tenth or shorter than a maximum width of a single light source of each of the plurality of light source as viewed along a light emission direction.

13. The planar lighting device according to claim 8, wherein each of the plurality of optical parts is recessed in a shape in a direction away from the light source, and the lens is arranged between the diffusion plate and the light source and arranged at a position in which a distance from a tip of each of the optical parts to the diffusion plate is longer than a distance from the tip of each of the optical parts to the light source.

14. The planar lighting device according to claim 8, wherein each of the plurality of optical parts is projecting toward the light source, and the lens is arranged between the diffusion plate and the light source and arranged at a position in which a distance from a bottom face of each of the optical parts to the diffusion plate is longer than a distance from the bottom face of each of the optical parts to the light source.

15. The planar lighting device according to claim 1, wherein the first optical parts that include a part that tapers from a bottom face having a hexagonal shape toward a tip.

16. The planar lighting device according to claim 15, wherein the lens is formed to have the optical element that further has a plurality of second optical parts that include a part that tapers from a bottom face having a triangular shape to a tip, the second optical parts being adjacent to the corresponding first optical part.

17. The planar lighting device according to claim 8, wherein in the optical element, an angle between the bottom face and an inclined face that intersects with the bottom face is 44° or greater and 58° or smaller, in order to make light emitted from the light source enters into the lens without being totally reflected, and make the light entered into the lens refracted and spread to enter into the diffusion plate.

* * * * *